US011836901B2

(12) United States Patent
Liu et al.

(10) Patent No.: US 11,836,901 B2
(45) Date of Patent: *Dec. 5, 2023

(54) CONTENT ADAPTED BLACK LEVEL COMPENSATION FOR A HDR DISPLAY BASED ON DYNAMIC METADATA

(71) Applicant: SAMSUNG ELECTRONICS CO., LTD., Suwon-si (KR)

(72) Inventors: Chenguang Liu, Tustin, CA (US); William Mandel, Moorpark, CA (US); Dung Trung Vo, Costa Mesa, CA (US); McClain C. Nelson, Anaheim, CA (US); Soojung Hyun, Tustin, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,304

(22) Filed: Nov. 7, 2022

(65) Prior Publication Data

US 2023/0120505 A1  Apr. 20, 2023

Related U.S. Application Data

(63) Continuation of application No. 17/169,207, filed on Feb. 5, 2021, now Pat. No. 11,526,968.

(Continued)

(51) Int. Cl.
*G06T 5/00* (2006.01)

(52) U.S. Cl.
CPC .... *G06T 5/009* (2013.01); *G06T 2207/20208* (2013.01)

(58) Field of Classification Search
None
See application file for complete search history.

(56) References Cited

U.S. PATENT DOCUMENTS 6,700,628 B1  3/2004  Kim et al.
9,076,218 B2  7/2015  Tsai et al.
(Continued)

FOREIGN PATENT DOCUMENTS

EP    1418543 B1       5/2008
KR    20160121782 A   10/2016
WO    2020146655 A1   7/2020

OTHER PUBLICATIONS

Ikizyan, I., "HDR Dynamic Tone Mapping with Enhanced Rendering Control", SID Symposium Digest of Technical Papers, May 29, 2019, pp. 303-306, v. 50, issue 1, Wiley Online Library, United States.

(Continued)

*Primary Examiner* — Yanna Wu
(74) *Attorney, Agent, or Firm* — SHERMAN IP LLP; Kenneth L. Sherman; Hemavathy Perumal

(57) ABSTRACT

One embodiment provides a method comprising determining metadata corresponding to an input image, determining a black level of a display device and a peak luminance value of the display device, and determining a tone mapping function that adaptively compensates for the black level of the display device based on the metadata, the black level of the display device, and the peak luminance value of the display device. The metadata comprises a distribution of luminance values in the input image. The black level of the display device and the peak luminance value of the display device represent a lowest luminance value and a highest luminance value, respectively, achievable on the display device. The method further comprises applying the tone mapping function to the input image to generate a tone-mapped image that adaptively compensates for the black level of the display device and provided to the display device for presentation.

20 Claims, 15 Drawing Sheets
(2 of 15 Drawing Sheet(s) Filed in Color)

Related U.S. Application Data

(60) Provisional application No. 63/118,598, filed on Nov. 25, 2020.

(56) References Cited

U.S. PATENT DOCUMENTS

| | | | |
|---|---|---|---|
| 9,165,210 | B1 | 10/2015 | Srinivasan et al. |
| 9,280,936 | B2 | 3/2016 | Delfs et al. |
| 9,478,157 | B2 | 10/2016 | Wu et al. |
| 11,176,646 | B2 | 11/2021 | Tao et al. |
| 11,398,017 | B2 | 7/2022 | Vo et al. |
| 2003/0031345 | A1 | 2/2003 | Farmer et al. |
| 2008/0297816 | A1 | 12/2008 | Nikkanen et al. |
| 2011/0205227 | A1 | 8/2011 | Fischer et al. |
| 2011/0292246 | A1 | 12/2011 | Brunner |
| 2012/0141014 | A1 | 6/2012 | Lepikhin et al. |
| 2013/0222645 | A1 | 8/2013 | Bilcu et al. |
| 2016/0005349 | A1 | 1/2016 | Atkins et al. |
| 2016/0360171 | A1 | 12/2016 | Tao et al. |
| 2016/0381401 | A1 | 12/2016 | Katsavounidis et al. |
| 2017/0116963 | A1 | 4/2017 | Wanat et al. |
| 2017/0214917 | A1 | 7/2017 | Jia et al. |
| 2017/0256039 | A1 | 9/2017 | Hsu et al. |
| 2017/0272690 | A1 | 9/2017 | Seifi et al. |
| 2018/0097992 | A1 | 4/2018 | Douady-Pleven et al. |
| 2018/0152686 | A1 | 5/2018 | Wozniak et al. |
| 2019/0188857 | A1 | 6/2019 | Rivard et al. |
| 2019/0304379 | A1 | 10/2019 | Pytlarz et al. |
| 2020/0014897 | A1 | 1/2020 | Kim et al. |
| 2021/0250564 | A1* | 8/2021 | Pieri ............ H04N 5/202 |
| 2022/0108429 | A1 | 4/2022 | Li et al. |
| 2022/0327672 | A1 | 10/2022 | Vo |

OTHER PUBLICATIONS

International Telecommunication Union (ITU-R), "Reference electro-optical transfer function for flat panel displays used in HDTV studio production", Rec. ITU-R BT.1886, Mar. 2011, 7 pages, downloaded on Jan. 29, 2021 at https://www.itu.int/dms_pubrec/itu-r/rec/bt/R-REC-BT.1886-0-201103-I!!PDF-E.pdf.

International Telecommunication Union (ITU-R), "High dynamic range television for production and international programme exchange," Rep. ITU-R BT.2390.7, Jul. 2019, 59 pages, downloaded on Jan. 29, 2021 at https://www.itu.int/dms_pub/itu-r/opb/rep/R-REP-BT.2390-7-2019-PDF-E.pdf.

International Search Report & Written Opinion dated Mar. 8, 2022 for International Application PCT/KR2021/013882 from Korean Intellectual Property Office, pp. 1-9, Republic of Korea.

International Search Report & Written Opinion dated Jan. 19, 2022 for International Application PCT/KR2021/013882 from Korean Intellectual Property Office, pp. 1-9, Republic of Korea.

U.S. Corrected Notice of Allowability for U.S. Appl. No. 17/169,201 dated Apr. 15, 2022.

U.S. Corrected Notice of Allowability for U.S. Appl. No. 17/169,201 dated May 2, 2022.

U.S. Corrected Notice of Allowability for U.S. Appl. No. 17/169,201 dated Jun. 15, 2022.

U.S. Non-Final Office Action for U.S. Appl. No. 17/169,207 dated Mar. 14, 2022.

U.S. Final Office Action for U.S. Appl. No. 17/169,207 dated May 3, 2022.

U.S. Advisory Action for U.S. Appl. No. 17/169,207 dated Jul. 12, 2022.

U.S. Notice of Allowance for U.S. Appl. No. 17/169,207 dated Aug. 8, 2022.

U.S. Non-Final Office Action for U.S. Appl. No. 17/169,201 dated Dec. 22, 2021.

U.S. Notice of Allowance for U.S. Appl. No. 17/169,201 dated Mar. 18, 2022.

U.S. Non-Final Office Action for U.S. Appl. No. 17/809,532 dated May 31, 2023.

* cited by examiner

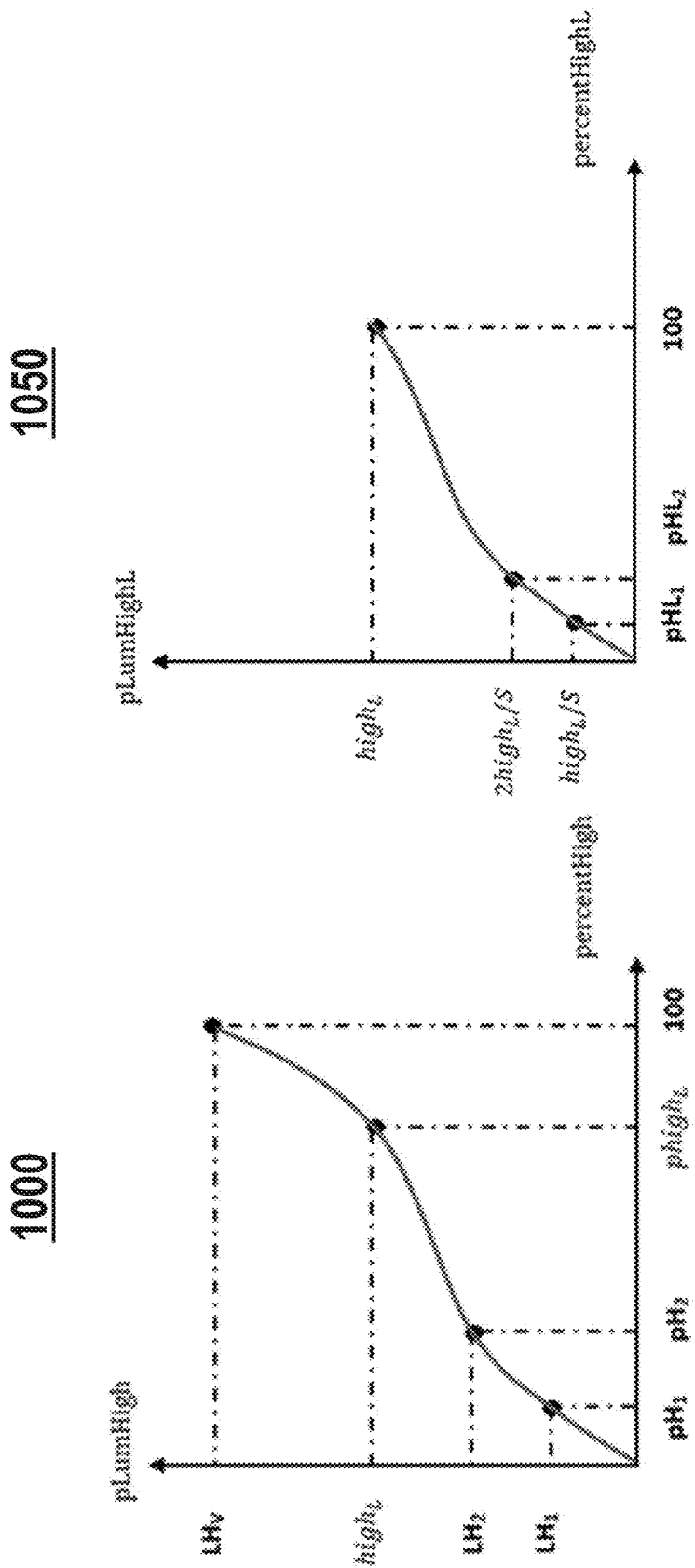

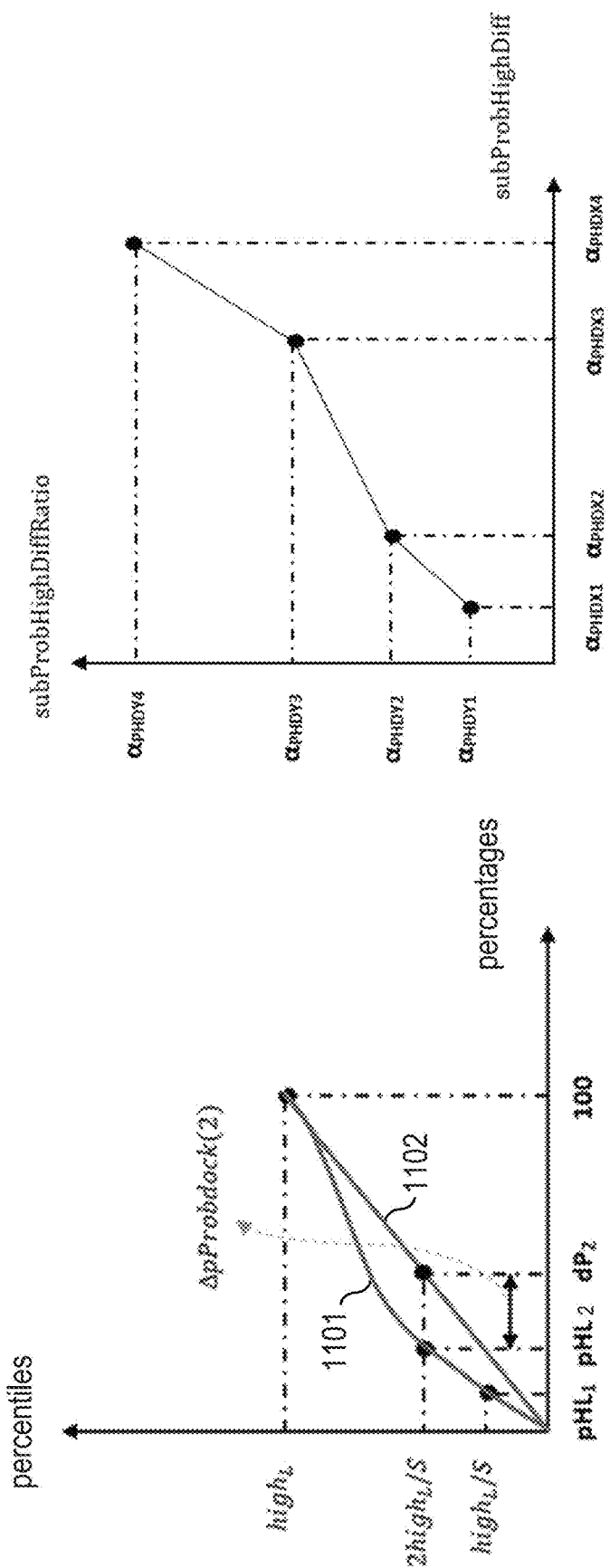

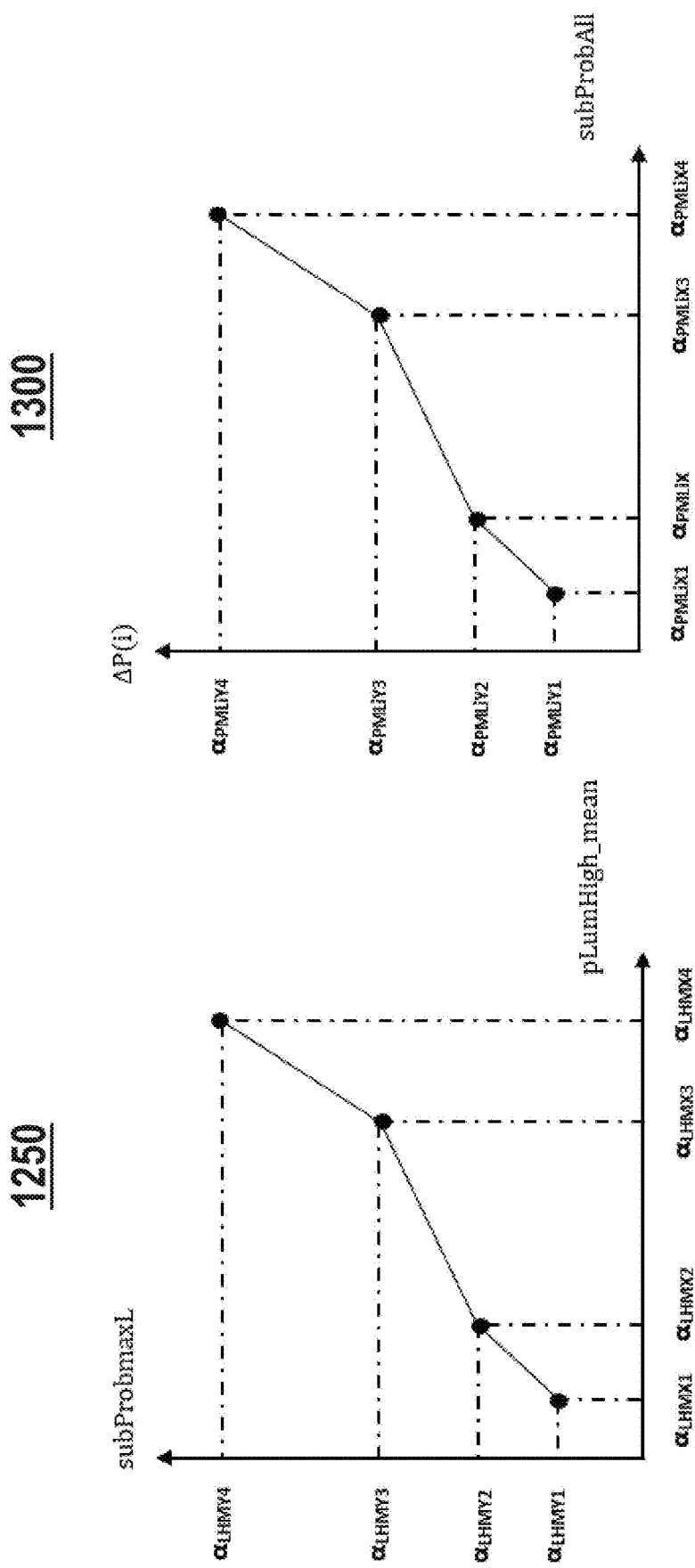

1550

1500

1600

CONTENT ADAPTED BLACK LEVEL COMPENSATION FOR A HDR DISPLAY BASED ON DYNAMIC METADATA

CROSS-REFERENCE TO RELATED APPLICATIONS

The present application is a continuation of and claims priority to U.S. patent application Ser. No. 17/169,207, filed on Feb. 5, 2021, which in turn claims priority to U.S. Provisional Patent Application No. 63/118,598, filed on Nov. 25, 2020, all incorporated herein by reference.

TECHNICAL FIELD

One or more embodiments generally relate to device settings for consumer electronics, in particular, a method and system for content adapted black level compensation for a high-dynamic range (HDR) display based on dynamic metadata.

BACKGROUND

Consumer electronic devices (e.g., smart television, smartphone, etc.) are now equipped with state-of-the-art display screens (e.g., QLED, OLED) that provide ultra-high picture quality.

SUMMARY

One embodiment provides a method comprising determining metadata corresponding to an input image, determining a black level of a display device and a peak luminance value of the display device, and determining a tone mapping function that adaptively compensates for the black level of the display device based on the metadata, the black level of the display device, and the peak luminance value of the display device. The metadata comprises a distribution of luminance values in the input image. The black level of the display device and the peak luminance value of the display device represent a lowest luminance value and a highest luminance value, respectively, achievable on the display device. The method further comprises applying the tone mapping function to the input image to generate a tone-mapped image that adaptively compensates for the black level of the display device and provided to the display device for presentation.

Another embodiment provides a system comprising at least one processor and a non-transitory processor-readable memory device storing instructions that when executed by the at least one processor causes the at least one processor to perform operations. The operations include determining metadata corresponding to an input image, determining a black level of a display device and a peak luminance value of the display device, and determining a tone mapping function that adaptively compensates for the black level of the display device based on the metadata, the black level of the display device, and the peak luminance value of the display device. The metadata comprises a distribution of luminance values in the input image. The black level of the display device and the peak luminance value of the display device represent a lowest luminance value and a highest luminance value, respectively, achievable on the display device. The operations further include applying the tone mapping function to the input image to generate a tone-mapped image that adaptively compensates for the black level of the display device and provided to the display device for presentation.

One embodiment provides a non-transitory processor-readable medium that includes a program that when executed by a processor performs a method comprising determining metadata corresponding to an input image, determining a black level of a display device and a peak luminance value of the display device, and determining a tone mapping function that adaptively compensates for the black level of the display device based on the metadata, the black level of the display device, and the peak luminance value of the display device. The metadata comprises a distribution of luminance values in the input image. The black level of the display device and the peak luminance value of the display device represent a lowest luminance value and a highest luminance value, respectively, achievable on the display device. The method further comprises applying the tone mapping function to the input image to generate a tone-mapped image that adaptively compensates for the black level of the display device and provided to the display device for presentation.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which:

FIG. 10 is a graph illustrating percentages and percentiles, in one or more embodiments;

FIG. 11 is a graph illustrating interpolated percentages and interpolated percentiles, in one or more embodiments;

FIG. 12 is a graph illustrating differences between interpolated percentiles and uniform histogram percentiles, in one or more embodiments;

FIG. 13 is a graph illustrating a ramp function for a factor, in one or more embodiments;

FIG. 15 is a graph illustrating a ramp function for a factor, in one or more embodiments;

FIG. 16 is a graph illustrating a ramp function for a curve modifier, in one or more embodiments;

DETAILED DESCRIPTION

Figure 1:
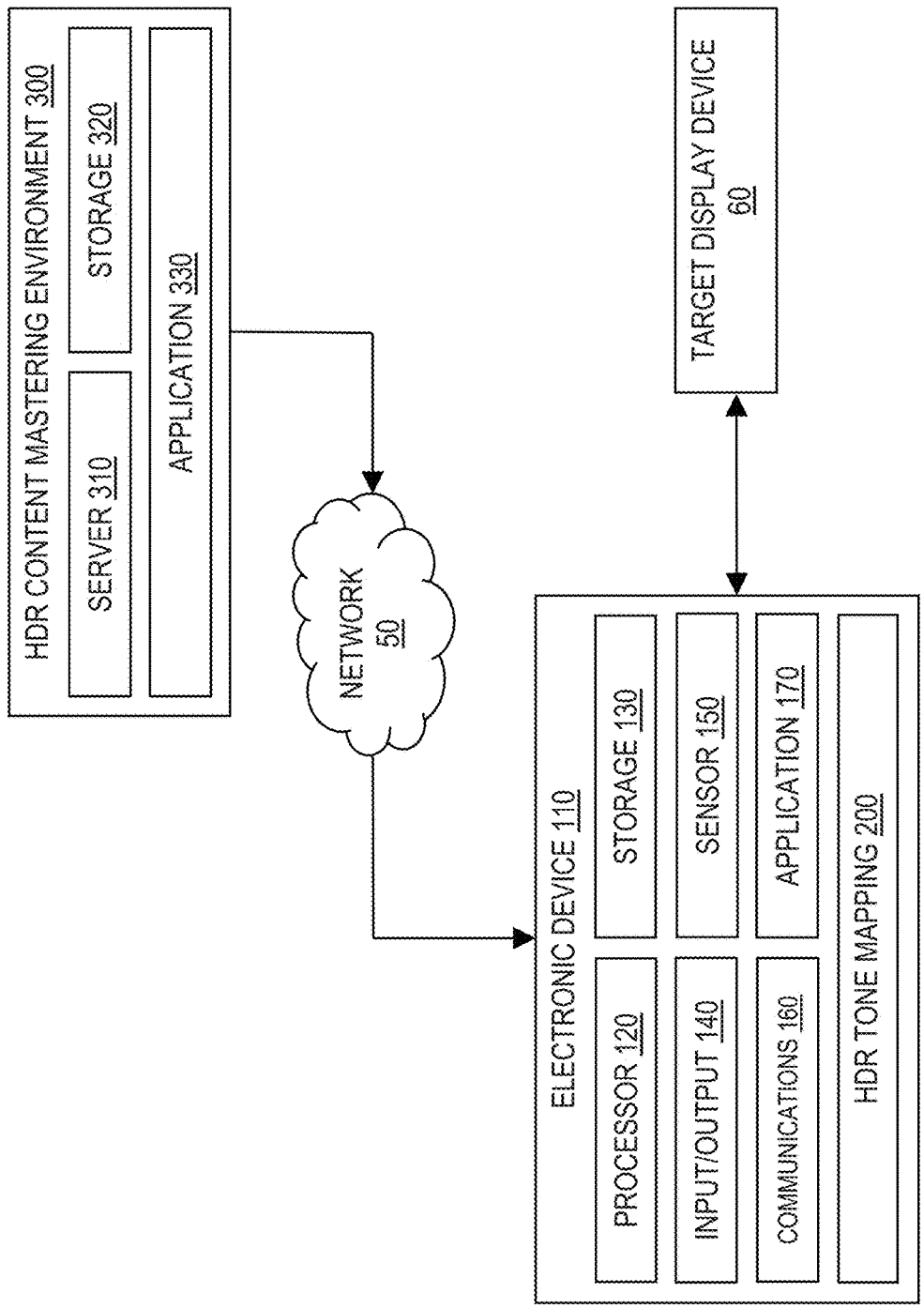
FIG. 1 illustrates an example computing architecture for implementing content adapted black level compensation for a high-dynamic range (HDR) display based on dynamic metadata, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to device settings for consumer electronics, in particular, a method and system for content adapted black level compensation for a high-dynamic range (HDR) display based on dynamic metadata. One embodiment provides a method comprising determining metadata corresponding to an input image, determining a black level of a display device and a peak luminance value of the display device, and determining a tone mapping function that adaptively compensates for the black level of the display device based on the metadata, the black level of the display device, and the peak luminance value of the display device. The metadata comprises a distribution of luminance values in the input image. The black level of the display device and the peak luminance value of the display device represent a lowest luminance value and a highest luminance value, respectively, achievable on the display device. The method further comprises applying the tone mapping function to the input image to generate a tone-mapped image that adaptively compensates for the black level of the display device and provided to the display device for presentation.

Another embodiment provides a system comprising at least one processor and a non-transitory processor-readable memory device storing instructions that when executed by the at least one processor causes the at least one processor to perform operations. The operations include determining metadata corresponding to an input image, determining a black level of a display device and a peak luminance value of the display device, and determining a tone mapping function that adaptively compensates for the black level of the display device based on the metadata, the black level of the display device, and the peak luminance value of the display device. The metadata comprises a distribution of luminance values in the input image. The black level of the display device and the peak luminance value of the display device represent a lowest luminance value and a highest luminance value, respectively, achievable on the display device. The operations further include applying the tone mapping function to the input image to generate a tone-mapped image that adaptively compensates for the black level of the display device and provided to the display device for presentation.

One embodiment provides a non-transitory processor-readable medium that includes a program that when executed by a processor performs a method comprising determining metadata corresponding to an input image, determining a black level of a display device and a peak luminance value of the display device, and determining a tone mapping function that adaptively compensates for the black level of the display device based on the metadata, the black level of the display device, and the peak luminance value of the display device. The metadata comprises a distribution of luminance values in the input image. The black level of the display device and the peak luminance value of the display device represent a lowest luminance value and a highest luminance value, respectively, achievable on the display device. The method further comprises applying the tone mapping function to the input image to generate a tone-mapped image that adaptively compensates for the black level of the display device and provided to the display device for presentation.

For expository purposes, the term "creative intent" generally denotes a particular visualization of an image that a content provider or content creator (e.g., a colorist at a studio) intended for an audience to see.

For expository purposes, the term "black level" generally denotes a lowest achievable luminance value of a display.

For expository purposes, the term "peak luminance value" generally denotes a highest achievable luminance value of a display.

For expository purposes, the terms "tone mapping curve" and "tone mapping function" are used interchangeably in this specification. For expository purposes, the term "black level compensation curve" as used herein generally represents a tone mapping curve with compensation for a black level ("black level compensation") of a display.

During capture of content, objects that are completely dark are recorded as zero code value. To reproduce the same appearance of objects that are completely dark on a display (e.g., a HDR display such as a HDR LCD display or a HDR OLED display), pixel luminance representing these objects should be zero nits. However, this is difficult to accomplish with conventional technologies because of various reasons such as, but not limited to, an LCD panel having imperfectly closed gates, an OLED panel having an imperfect turn off, or leaking luminance between pixels. Further, even if a zero code value is fed, pixel luminance is still not zero nits.

The Ultra HD Alliance requires that a HDR LCD display have a peak brightness of over 1000 cd/m2 and a black level of less than 0.05 cd/m2. The Ultra HD Alliance further requires that a HDR OLED display have a peak brightness of over 540 cd/m2 and a black level of less than 0.0005 cd/m2.

Reproducing the same content on HDR displays with different black levels results in different appearances (i.e., picture quality) on the HDR displays, especially with images of the content with dark details. The higher the black level of a HDR display, the more distortion among pixels representing objects that are completely dark.

During color grading of original content (e.g., by a colorist at a studio), the content is typically displayed on a reference display with a black level that is nearly zero. Reproducing the resulting color graded content on a target display (e.g., a consumer display device, such as a consumer-grade HDR TV) with a black level that is different than the reference display will distort picture quality of the content on the target display. For example, a gray pattern reproduced on target displays with non-zero black levels appears washed out with less contrast (i.e., less distinguished black stripes and grayish black). To improve picture quality of color graded content on a target display, the color graded content is tone mapped from the dynamic range of the reference display to the dynamic range of the target display. Convention HDR tone rendering solutions permit transfer of frame or scene statistics information for the original content to the target display.

One or more embodiments provide HDR tone rendering with content adapted black level compensation that dynamically corrects picture quality of content reproduced on HDR displays with different black levels based on dynamic metadata to preserve creative intent. The HDR tone rendering compensates for differences in black levels between a reference display (e.g., on which the content is shown during color grading) and a target display (e.g., on which the resulting color graded content is reproduced), thereby preserving dark details created by a content provider/content creator, such as black details and/or shadow details, across HDR displays with different black levels.

One or more embodiments provide a method and system for HDR image creative intent tuning that substantially matches picture quality of content displayed on a reference display with picture quality of the same content reproduced on a target display.

One or more embodiments provide a method and system for HDR video tone mapping. In one embodiment, the HDR video tone mapping includes: (1) receiving an input video for presentation on a target display device, (2) receiving metadata that is at least partially representative of frame or scene statistics information for the video, (3) determining an adaptive/customized tone mapping function with content adapted black level compensation based at least on the metadata, black level of the target display, and a characteristic of the target display device, and (4) applying the tone mapping function to the input video to generate a tone-mapped video with content adapted black level compensation, wherein a peak luminance value of the target display device is utilized in the application of the tone mapping function, and the tone-mapped video is provided to the target display device for presentation on the target display device.

FIG. 1 illustrates an example computing architecture 100 for implementing content adapted black level compensation for a HDR display based on dynamic metadata, in one or more embodiments. The computing architecture 100 comprises an electronic device 110 including resources, such as one or more processor units 120 and one or more storage units 130. One or more applications may execute/operate on the electronic device 110 utilizing the resources of the electronic device 110.

In one embodiment, the one or more applications on the electronic device 110 include a HDR tone mapping 200 configured to implement HDR tone mapping of HDR content for presentation on a target display device (e.g., a HDR rendering display/device) 60 integrated in or coupled to the electronic device 110. In one embodiment, the HDR tone mapping 200 is configured to provide content adapted black level compensation based on dynamic metadata. As described in detail later herein, the HDR tone mapping 200 is configured to: (1) receive an input video (e.g., a HDR video) for presentation on the target display device 60, (2) receive multi-dimensional creative intent metadata corresponding to the input video, wherein the creative intent metadata is indicative of an intent of a content creator/content provider of the input video, and (3) improve picture quality during presentation of the input video on the target display device 60 based on the creative intent metadata and a black level of the target display device 60, thereby preserving dark details created by the content creator/content provider. In one embodiment, the picture quality is improved by providing content adapted black level compensation based on the creative intent metadata, and/or modifying a tone mapping curve based on the black level compensation.

In one embodiment, creative intent metadata corresponding to an input video comprises contains per frame or scene statistics information for the entire input video (e.g., the entire HDR video). For example, in one embodiment, the creative intent metadata comprises, for each image (e.g., HDR image) of the input video, dynamic luminance percentile information corresponding to the image. Luminance percentile information corresponding to an image represents a distribution (i.e., number) of pixels in the image. For example, in one embodiment, luminance percentile information corresponding to an image comprises one or more percentiles of a cumulative distribution function (CDF) of pixels in the image. In one embodiment, the CDF is indicative of one or more of the following: whether the image is dark or bright, which dynamic range of the CDF has dark details and degree/level of darkness of the dark details, or which dynamic range of the CDF has bright details and degree/level of brightness of the bright details. For example, if the CDF includes a particular range that is steeper than at least one other range of the CDF, there are more details (i.e., more pixels) in this particular range compared to the at least one other range. As another example, if the CDF includes a particular range that is flatter than at least one other range of the CDF, there are fewer details (i.e., less pixels) in this particular range compared to the at least one other range.

In one embodiment, for each image (e.g., HDR image) of the input content, the HDR tone mapping system 200 is configured to generate, based on a CDF of pixels in the image, a tone mapping curve corresponding to the image. The tone mapping curve comprises multiple sections that preserve contrast. For example, if the CDF includes a particular range that is steeper than at least one other range of the CDF, the tone mapping curve includes a section corresponding to the steeper range, wherein the corresponding section is steeper than at least one other section of the tone mapping curve as there are more details to preserve. As another example, if the CDF includes a particular range that is flatter than at least one other range of the CDF, the tone mapping curve includes a section corresponding to the flatter range, wherein the corresponding section is flatter than at least one other section of the tone mapping curve as there are fewer details to preserve. Based on CDFs of pixels in images of the input video, the HDR tone mapping system 200 is able to differentiate the images and apply different black level compensation curves based on the CDFs (i.e., black level compensation is adaptive to creative intent metadata). For example, dark details in brighter images are lifted more to prevent the dark details from becoming crushed.

In one embodiment, luminance percentile information is represented as two-dimensional (2D) data. For example, in one embodiment, each percentile of a CDF curve included in luminance percentile information is represented as a pair {x, y} of values, wherein x is a percentile luminance value, and y is a pixel percentage value (e.g., {x=100, y=25%} represents that 25% of pixels are below 100 nits, i.e., $25^{th}$ percentile is 100 nits). Utilizing a tone mapping curve based on CDF enables noise removal (i.e., noisy pixels are removed).

Examples of an electronic device 110 include, but are not limited to, a television (e.g., a smart television), a mobile electronic device (e.g., a tablet, a smart phone, a laptop, etc.), a wearable device (e.g., a smart watch, a smart band, a head-mounted display, smart glasses, etc.), a set-top box, an Internet of things (IoT) device, etc.

In one embodiment, the electronic device 110 comprises one or more sensor units 150 integrated in or coupled to the electronic device 110, such as a camera, a microphone, a GPS, a motion sensor, etc. In one embodiment, the HDR tone mapping system 200 utilizes at least one of the one or more sensor units 150 to capture sensor data comprising one or more readings/measurements relating to the target display device 60 (e.g., a HDR display), such as a black level of the target display device 60, and a peak luminance value of the target display device 60.

In one embodiment, the electronic device 110 comprises one or more I/O units 140 integrated in or coupled to the electronic device 110. In one embodiment, the one or more I/O units 140 include, but are not limited to, a physical user interface (PUI) and/or a GUI, such as a keyboard, a keypad, a touch interface, a touch screen, a knob, a button, a display screen, etc. In one embodiment, a user can utilize at least one I/O unit 140 to configure one or more user preferences, configure one or more parameters, provide input, etc.

In one embodiment, the one or more applications on the electronic device 110 may further include one or more software mobile applications 170 loaded onto or downloaded to the electronic device 110, such as a camera application, a social media application, a video streaming application, etc. A software mobile application 170 on the electronic device 110 may exchange data with the system 200.

In one embodiment, the electronic device 110 comprises a communications unit 160 configured to exchange data with the target display device 60 (e.g., receiving display characteristics of the target display device 60 including the peak luminance value $D_{nit}$). The communications unit 160 is further configured to exchange data with a remote computing environment, such as a HDR content mastering environment 300 (e.g., receiving a video stream from the HDR content mastering environment 300), over a communications network/connection 50 (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the electronic device 110 and other devices connected to the same communications network 50. The communications unit 160 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 300 includes resources, such as one or more servers 310 and one or more storage units 320. One or more applications 330 that provide higher-level services may execute/operate on the remote computing environment 300 utilizing the resources of the remote computing environment 300. For example, in one embodiment, the remote computing environment 300 provides an online platform for hosting one or more online services (e.g., a video streaming service, etc.) and/or distributing one or more software mobile applications 170. As another example, the system 200 may be loaded onto or downloaded to the electronic device 110 from a remote computing environment 300 that maintains and distributes updates for the system 200. As yet another example, a remote computing environment 300 may comprise a cloud computing environment providing shared pools of configurable computing system resources and higher-level services.

Figure 2:
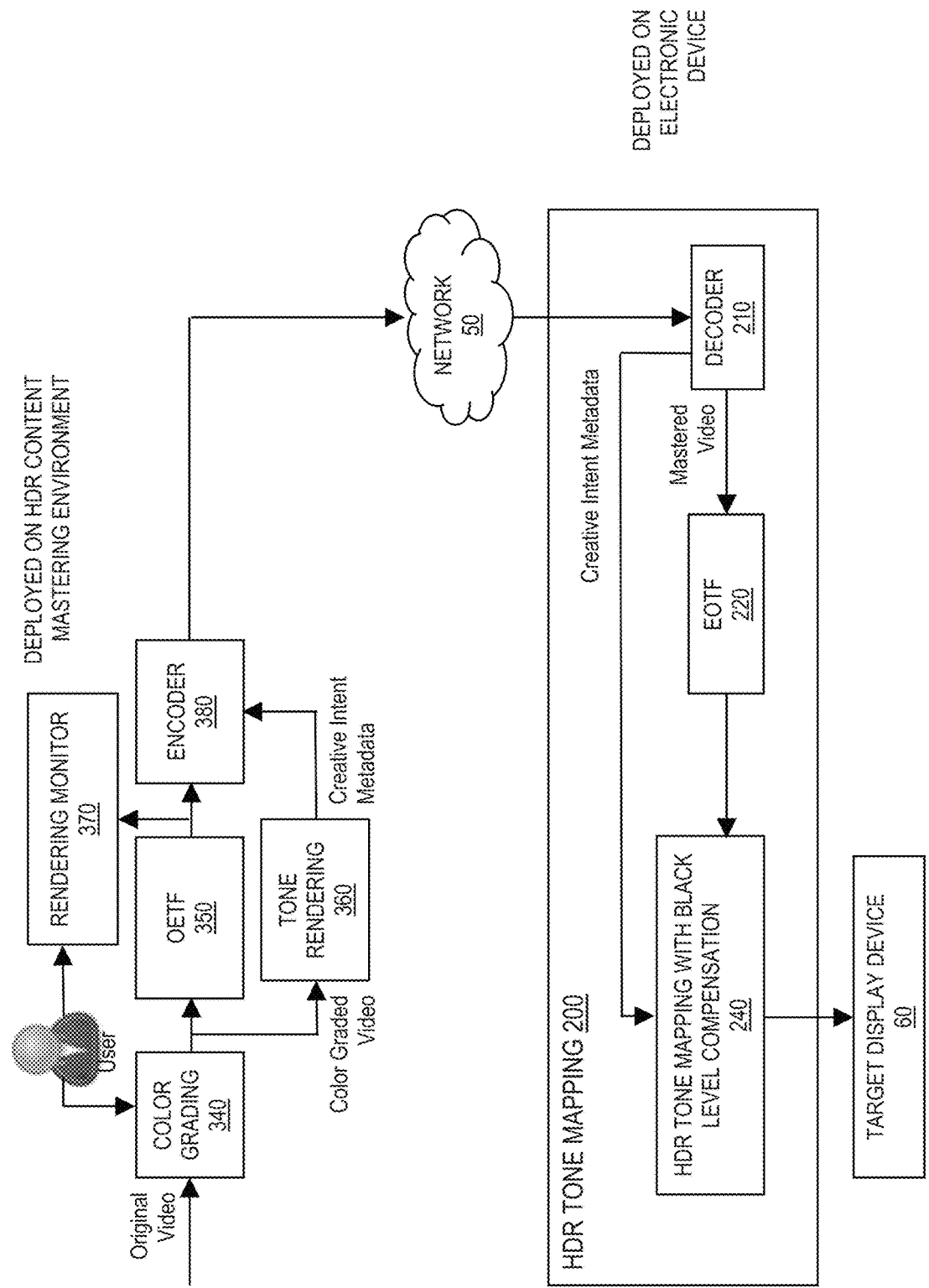
FIG. 2 illustrates an example workflow for implementing HDR tone mapping of HDR content for presentation on a display device, in one or more embodiments.

FIG. 2 illustrates an example workflow for implementing HDR tone mapping of HDR content for presentation on a target display device 60, in one or more embodiments. In one embodiment, the remote computing environment 300 represents a computing environment utilized for color grading at a studio. For example, in one embodiment, the one or more applications 330 deployed on the remote computing environment 300 comprise a color grading unit 340 configured to: (1) receive an original video, and (2) perform color grading on the original video based on input from a user (e.g., a colorist at the studio), resulting in a mastered video (i.e., color graded video).

In one embodiment, the one or more applications 330 deployed on the remote computing environment 300 comprise an Opto Electrical Transfer Function (OETF) 350 configured to: (1) receive a mastered video (e.g., from the color grading unit 340), and (2) apply OETF to the mastered video, resulting in an OETF video signal of the mastered video.

In one embodiment, the remote computing environment 300 comprises a rendering monitor 370 configured to: (1) receive an OETF video signal (e.g., from the OETF unit 350) of mastered video, and (2) provide a user (e.g., the colorist at the studio) with visual feedback of one or more color graded adjustments (i.e., adjustments to an original video resulting from color grading) by displaying the mastered video based on the OETF video signal.

The rendering monitor 370 is an example reference display. In one embodiment, the rendering monitor 370 is a high contrast HDR display, such as a HDR display with a peak luminance value of 4,000 nits and with a black level of zero nits ("zero black level"). The rendering monitor 370, however, may have very high contrast compared to the target display device 60. For example, the target display device 60 is a consumer-grade HDR TV with a peak luminance value of about 150 nits to 750 nits and a black level of about 0.0005 nits to 0.01 nits. Without black level compensation, on-screen picture quality of the mastered video on the rendering monitor 370 may be different than on-screen picture quality of the mastered video on the target display device 60, thereby degrading creative intent of a content provider/content creator of the mastered video. Without black level compensation, the on-screen picture quality of the mastered video on the target display device 60 progressively degrades as the black level of the target display device 60 increases.

In one embodiment, the one or more applications 330 deployed on the remote computing environment 300 comprise a tone rendering unit 360 configured to: (1) receive a mastered video (e.g., from the color grading unit 340), and (2) generate creative intent metadata corresponding to the mastered video, wherein the creative intent metadata comprises per frame or scene statistics information for the entire mastered video. In one embodiment, the tone rendering unit 360 automatically generates the creative intent metadata. In another embodiment, the tone rendering unit 360 generates the creative intent metadata based on input from a user (e.g., a content creator at the studio). As described in detail later herein, the creative intent metadata is utilized for content adapted black level compensation to dynamically correct picture quality of the mastered video reproduced on HDR displays with different black levels, thereby preserving creative intent (e.g., preserving dark details created by the content provider/content creator, such as black details and/or shadow details, across HDR displays with different black levels).

In one embodiment, the one or more applications 330 deployed on the remote computing environment 300 comprise an encoder unit 380 configured to: (1) receive an OETF video signal (e.g., from the OETF unit 350) of a mastered video, (2) receive creative intent metadata corresponding to the mastered video (e.g., from the tone rendering unit 360), (3) perform encoding (e.g., H.265 codec) on the OETF video signal, resulting in an encoded video that is combined with the creative intent metadata, and (4) provide the encoded video for transmission via the communications network 50.

In one embodiment, the HDR tone mapping system 200 comprises a decoder unit 210 deployed on the electronic device 110. In one embodiment, the decoder unit 210 is configured to: (1) receive an encoded video (e.g., from the remote computing environment 300) transmitted via the communications network 50, (2) perform decoding on the encoded video, resulting in an OETF video signal of a mastered video, and (3) extract, from the encoded video, creative intent metadata corresponding to the mastered video.

In one embodiment, the HDR tone mapping system 200 comprises an Electro-Optical Transfer Function (EOTF) unit 220 deployed on the electronic device 110. In one embodiment, the EOTF unit 220 is configured to: (1) receive an OETF video signal (e.g., from the decoder unit 210) of a mastered video, and (2) perform EOTF on the OETF video signal, resulting in the mastered video.

In one embodiment, the HDR tone mapping system 200 comprises a HDR tone mapping with black level compensation system 240 deployed on the electronic device 110. In one embodiment, the HDR tone mapping with black level compensation system 240 is configured to: (1) receive a mastered video (e.g., from the EOTF unit 220), (2) receive creative intent metadata corresponding to the mastered video (e.g., from the decoder unit 210), (3) determine a tone mapping function (i.e., tone mapping curve) that adaptively compensates for a black level of the target display device 60 based at least on the creative intent metadata, the black level of the target display device 60, and a peak luminance value of the target display device 60, (4) apply the tone mapping function to the mastered video, resulting in a tone-mapped video with content adapted black level compensation, and (5) provide the tone-mapped video to the target display device 60 for presentation on the target display device 60. In one embodiment, the HDR tone mapping system 200 determines the black level of the target display device 60 and the peak luminance value of the target display device 60 via one or more sensor units 150.

Figure 3:
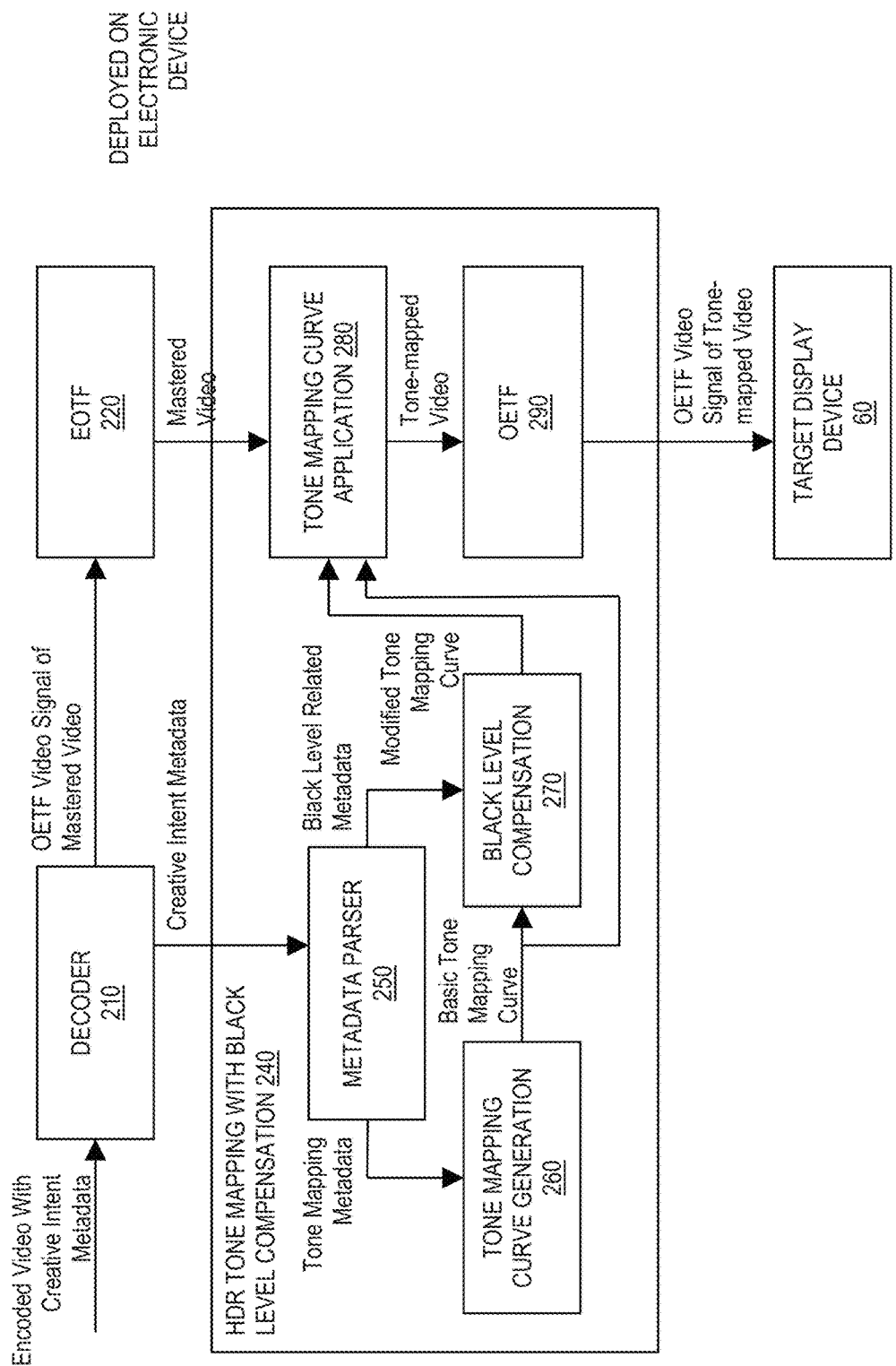
FIG. 3 illustrates an example HDR tone mapping with black level compensation system, in one or more embodiments.

FIG. 3 illustrates an example HDR tone mapping with black level compensation system 240, in one or more embodiments. In one embodiment, the HDR tone mapping with black level compensation system 240 comprises a metadata parser unit 250 deployed on the electronic device 110. In one embodiment, the metadata parser unit 250 is configured to: (1) receive creative intent metadata (e.g., from the decoder unit 210) corresponding to a mastered video, and (2) parse the creative intent metadata into two sets of metadata, specifically tone mapping metadata corresponding to the mastered video and black level related metadata corresponding to the mastered video.

Let $B_N(X)$ generally denote an $N^{th}$ order explicit Bezier curve. In one embodiment, an $N^{th}$ order explicit Bezier curve $B_N(X)$ is determined in accordance with equation (1) provided below:

$$B_N(x) = \sum_{k=0}^{N} \binom{N}{k} x^k (1-x)^{N-k} P_k, \quad (1)$$

wherein $x \in [0,1]$, x is a de-quantized luminance value of an image of the mastered video after EOTF in a normalized domain (N k), the normalized domain (N k) is determined in accordance with equation (2) provided below:

$$\binom{N}{k} = \frac{N!}{k!(N-k)!}, \quad (2)$$

and $(P_0, P_1, \ldots, P_N)$ is a set of parameters that characterizes the Bezier curve $B_N(X)$.

In one embodiment, the HDR tone mapping with black level compensation system 240 comprises a tone mapping curve generation unit 260 deployed on the electronic device 110. In one embodiment, the tone mapping curve generation unit 260 is configured to: (1) receive tone mapping metadata corresponding to a mastered video, and (2) determine, based on the tone mapping metadata, a dynamic mid tone and highlight basic tone mapping function (i.e., basic tone mapping curve) and corresponding parameters that characterize the basic tone mapping function.

In one embodiment, the mid tone and highlight basic tone mapping function is generated by the tone mapping curve generation unit 260 deployed on the electronic device 110. In another embodiment, the mid tone and highlight basic tone mapping function is generated by the tone rendering unit 360 deployed on the remote computing environment 300 (i.e., the tone mapping metadata includes the basic tone mapping function).

Let $f(x, \theta_{tm})$ generally denote an $N^{th}$ order explicit Bezier curve, wherein $\theta_{tm} = (P_0, P_1, \ldots, P_N)$. In one embodiment, the mid tone and highlight basic tone mapping function comprises an $N^{th}$ order explicit Bezier curve $f(x, \theta_{tm})$.

In one embodiment, the HDR tone mapping with black level compensation system 240 comprises a black level compensation unit 270 deployed on the electronic device 110. In one embodiment, the black level compensation unit 270 is configured to: (1) receive black level related metadata corresponding to a mastered video (e.g., from the metadata parser unit 250), (2) receive a mid tone and highlight basic tone mapping function and corresponding parameters that characterize the basic tone mapping function (e.g., from the tone mapping curve generation unit 260), and (3) generate a modified tone mapping function (i.e., modified tone mapping curve) and corresponding parameters that characterize the modified tone mapping function by modifying the basic tone mapping function based on the black level related metadata, the black level of the target display device 60, and the peak luminance value of the target display device 60. The modified tone mapping function preserves creative intent of a content provider/content creator of the mastered video as it factors into account the black level related metadata. As described in detail later herein, applying the modified tone mapping function to the mastered video adaptively compensates for the black level of the target display device 60.

Let g generally denote a piecewise explicit Bezier curve. In one embodiment, the modified tone mapping function comprises a piecewise explicit Bezier curve g with content adapted black level compensation. Let $h(x, \beta_{bl})$ generally denote an $M^{th}$ order explicit Bezier curve with black level compensation ("dark details compensation function"), wherein $\beta_{bl}$ is a set of parameters that characterizes the dark details compensation function, and $\beta_{bl}=(Q_0, Q_1, \ldots, Q_M)$. In one embodiment, the piecewise explicit Bezier curve g is determined in accordance with equation (3) provided below:

$$g = \begin{cases} k_y + (1-k_y)B_N\left(\dfrac{x-k_x}{1-k_x}\right), & k_x < x \leq 1 \\ k_y B_M\left(\dfrac{x}{k_x}\right), & 0 \leq x \leq k_x \end{cases}, \quad (3)$$

wherein the dark details compensation function $$h(x, \beta_{bl}) = k_y B_M\left(\dfrac{x}{k_x}\right),$$

the mid tone and highlight basic tone mapping function $$f(x, \theta_{tm}) = k_y + (1-k_y)B_N\left(\dfrac{x-k_x}{1-k_x}\right),$$

$k_x$ is determined in accordance with equation (4) provided below:

$$k_x = k_y = \dfrac{L_c}{S_{max}}, \quad (4)$$

$B_M(t)$ is determined in accordance with equation (5) provided below:

$$B_M(t) = \sum_{k=0}^{M} \binom{M}{k} t^k (1-t)^{M-k} Q_k, \quad (5)$$

and
$B_N(t)$ is determined in accordance with equation (6) provided below:

$$B_N(t) = \sum_{k=0}^{N} \binom{N}{k} t^k (1-t)^{N-k} P_k. \quad (6)$$

In one embodiment, the HDR tone mapping with black level compensation system 240 comprises a tone mapping curve application system 280 deployed on the electronic device 110. In one embodiment, the tone mapping curve application system 280 is configured to: (1) receive a mastered video (e.g., from the EOTF unit 220), (2) receive a modified tone mapping function (i.e., tone mapping curve) and corresponding parameters (e.g., from the black level compensation unit 270) that characterize the modified tone mapping function, (3) receive a mid tone and highlight basic tone mapping function and corresponding parameters (e.g., from the tone mapping curve generation unit 260) that characterize the basic tone mapping function, and (4) generate a tone-mapped video by selectively applying one of the modified tone mapping function or the basic tone mapping function to the mastered video based on the black level of the target display device 60.

Specifically, in one embodiment, if the black level of the target display device 60 is zero or substantially similar to a black level of a reference display utilized during color grading of the mastered video (e.g., a rendering monitor 370), the tone mapping curve application unit 280 applies the basic tone mapping function $f(x, \theta_{tm})$ to the mastered video, resulting in the tone-mapped video without black level compensation. If the black level of the target display device 60 is non-zero and substantially different from the black level of the reference display, the tone mapping curve application unit 280 applies the piecewise explicit Bezier curve g to the mastered video, resulting in the tone-mapped video that adaptively compensates for the black level of the target display device 60.

In one embodiment, the HDR tone mapping with black level compensation system 240 comprises an OETF unit 290 deployed on the electronic device 110. In one embodiment, the OETF unit 290 is configured to: (1) receive a tone-mapped video (e.g., from the tone mapping curve application system 280), (2) apply OETF to the tone-mapped video, resulting in an OETF video signal of the tone-mapped video, and (3) provide the OETF video signal to the target display device 60 for presentation of the tone-mapped video on the target display device 60.

Figure 4:
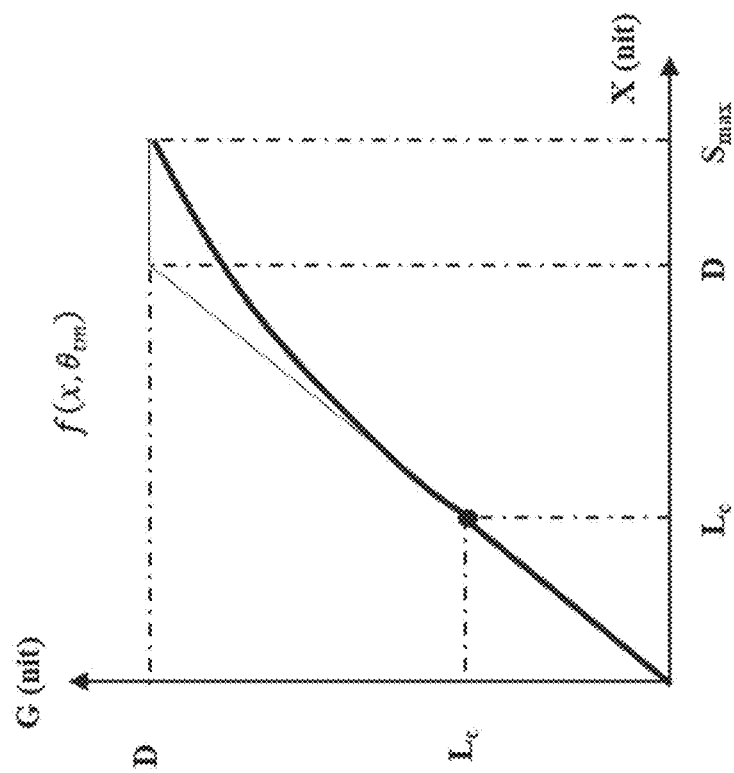
FIG. 4 is a graph illustrating a mid tone and highlight basic tone mapping function, in one or more embodiments.

FIG. 4 is a graph 500 illustrating a mid tone and highlight basic tone mapping function $f(x, \theta_{tm})$, in one or more embodiments. A horizontal axis of the graph 500 represents a de-quantized luminance value x of an image (i.e., frame/scene) of a mastered video ("mastered image") after EOTF in nits. A vertical axis of the graph 500 represents a luminance value G of an image (i.e., frame/scene) of a tone-mapped video ("tone-mapped image") in nits. Let $S_{max}$ denote a maximum brightness level of the mastered image in cd/m². Let $L_c$ denote a cut off threshold for the basic tone mapping function $f(x, \theta_{tm})$. If the black level of the target display device 60 is zero or substantially similar to a black level of the reference display, the tone mapping curve application unit 280 applies the basic tone mapping function $f(x, \theta_{tm})$ to the mastered video, resulting in the tone-mapped video without black level compensation.

Figure 5:
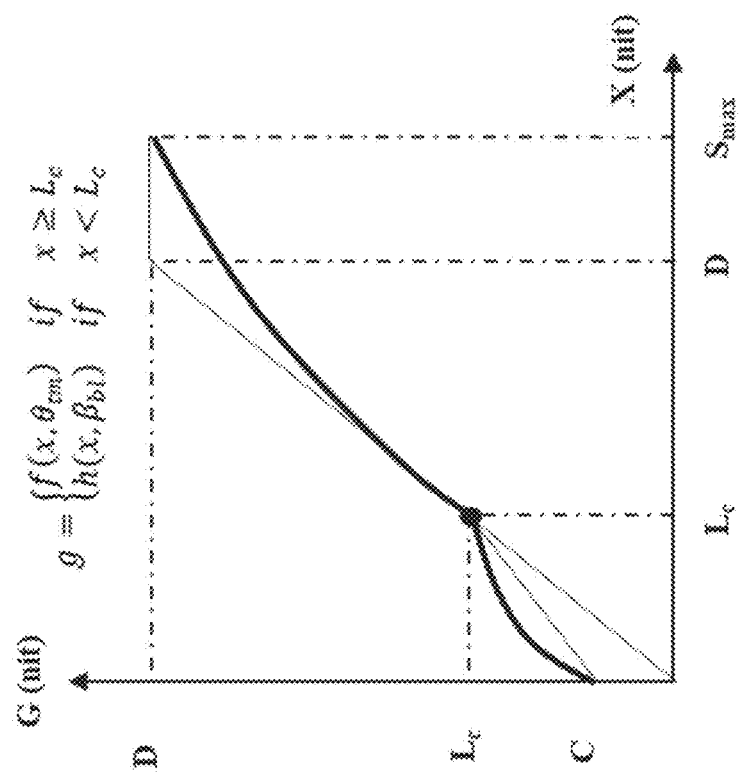
FIG. 5 is a graph illustrating an example piecewise explicit Bezier curve, in one or more embodiments.

FIG. 5 is a graph 550 illustrating an example piecewise explicit Bezier curve g, in one or more embodiments. A horizontal axis of the graph 550 represents a de-quantized luminance value x of a mastered image after EOTF in nits. A vertical axis of the graph 550 represents a luminance value G of a tone-mapped image in nits. If the black level of the target display device 60 is non-zero and substantially different from the black level of the reference display, the black level compensation unit 270 generates the piecewise explicit Bezier curve g. As shown in FIG. 5, if the de-quantized luminance value x of the mastered image is less than the cut off threshold $L_c$ for the basic tone mapping function $f(x, \theta_{tm})$ (i.e., $x<L_c$), the tone mapping curve application unit 280 applies the dark details mapping function $h(x, \beta_{bl})$ to the mastered image, resulting in the tone-mapped image with compensation for the black level of the target display device 60 (i.e., the black level compensation is content adapted). If the de-quantized luminance value x of the mastered image is equal to or greater than the cut off threshold $L_c$ for the basic tone mapping function $f(x, \theta_{tm})$ (i.e., $x \geq L_c$), the tone mapping curve application unit 280 applies the basic tone mapping function $f(x, \theta_{tm})$ to the mastered image, resulting in the tone-mapped image without compensation for the black level of the target display device 60.

Figure 6:
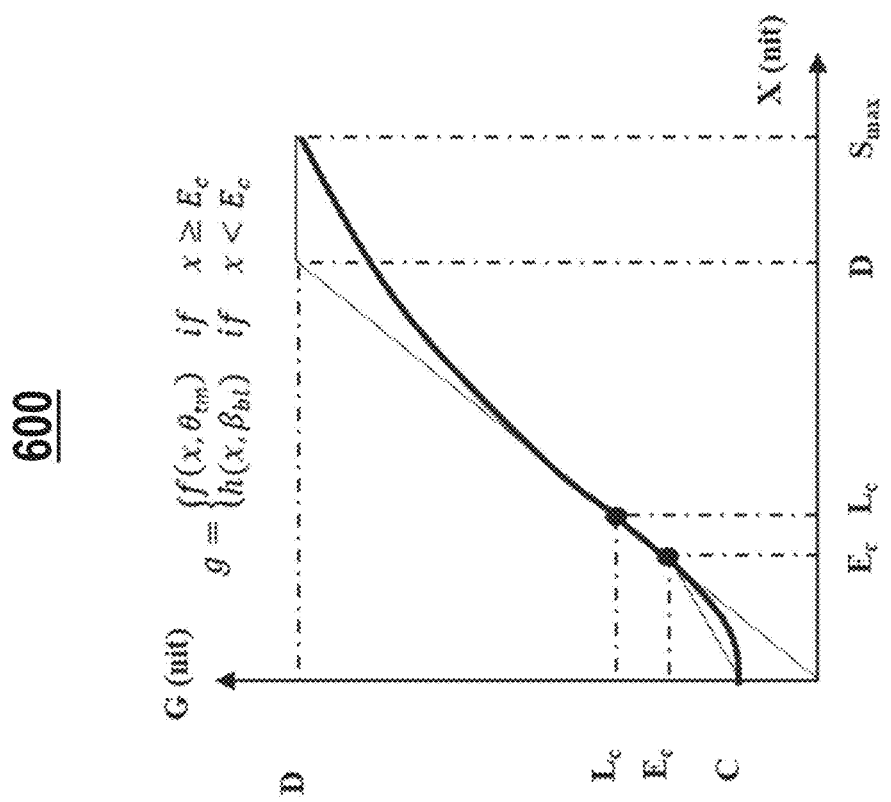
FIG. 6 is a graph illustrating another example piecewise explicit Bezier curve, in one or more embodiments.

FIG. 6 is a graph 600 illustrating another example piecewise explicit Bezier curve g, in one or more embodiments. A horizontal axis of the graph 600 represents a de-quantized luminance value x of a mastered image after EOTF in nits. A vertical axis of the graph 600 represents a luminance value G of a tone-mapped image in nits. Let $E_c$ denote a cut off threshold for the dark details mapping function $h(x, \beta_{bl})$. If the black level of the target display device 60 is non-zero and different from the black level of the reference display, the black level compensation unit 270 generates the piecewise explicit Bezier curve g. As shown in FIG. 6, if the de-quantized luminance value x of the mastered image is less than the cut off threshold $E_c$ for the dark details mapping function $h(x, \beta_{bl})$ (i.e., $x<E_c$), the tone mapping curve application unit 280 applies the dark details mapping function $h(x, \beta_{bl})$ to the mastered image, resulting in the tone-mapped image with compensation for the black level of the target display device 60 (i.e., the black level compensation is content adapted). If the de-quantized luminance value x of the mastered image is equal to or greater than the cut off threshold $E_c$ for the dark details mapping function $h(x, \beta_{bl})$ (i.e., $x \geq E_c$), the tone mapping curve application unit 280 applies the basic tone mapping function $f(x, \theta_{tm})$ to the mastered image, resulting in the tone-mapped image without compensation for the black level of the target display device 60.

Figure 7:
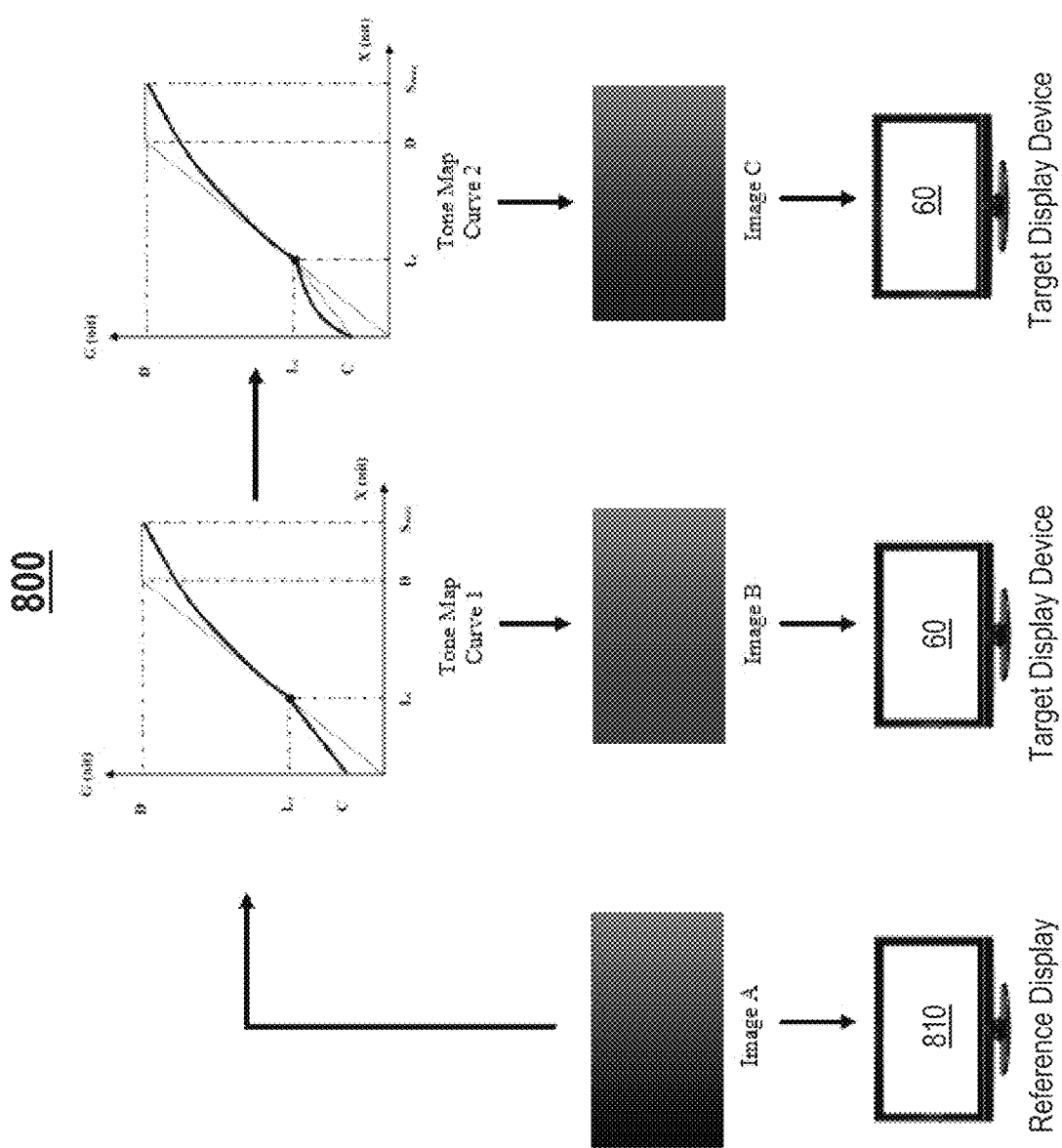
FIG. 7 illustrates an example black level compensation development system, in one or more embodiments.

FIG. 7 illustrates an example black level compensation development system 800, in one or more embodiments. In one embodiment, the black level compensation development system 800 is utilized to implement a learning process during which manually tuned parameters $P_{tuned}$ and $Q_{tuned}$ that characterize a tone mapping curve with black level compensation are learned. Specifically, in one embodiment, the black level compensation development system 800 comprises: (1) a reference display 810, and (2) a target display device 60 with a black level that is different than a black level of the reference display 810.

The learning process involves the following steps: (1) displaying a mastered image Image A from a set of training samples on the reference display 810 to show an operator (or developer) creative intent, (2) the operator manually selecting parameters P and Q that characterize a first tone mapping curve Tone Map Curve 1, (3) applying the first tone mapping curve Tone Map Curve 1 and the corresponding parameters P and Q to the mastered image Image A to generate a tone-mapped image Image B that does not preserve the creative intent, (4) displaying the tone-mapped image Image B on the target display device 60, and (5) the operator comparing the mastered image Image A and the tone-mapped image Image B.

Due to differences in black levels of the reference display 810 and the target display device 60, on-screen picture quality of the mastered image Image A is different from on-screen picture quality of the tone-mapped image Image B. For example, zero code values (i.e., black colors) of the mastered image Image A appear grayish when reproduced on the target display device 60 as part of the tone-mapped Image B.

The learning process further involves the following steps: (1) based on the comparison between the mastered image Image A and the tone-mapped image Image B, the operator manually tuning the parameters P and Q to generate manually tuned parameters $P_{tuned}$ and $Q_{tuned}$ that characterize a second tone mapping curve Tone Map Curve 2, (2) applying the second tone mapping curve Tone Map Curve 2 with the corresponding manually tuned parameters $P_{tuned}$ and $Q_{tuned}$ to the mastered image Image A to generate a tone-mapped image Image C that preserves the creative intent, and (3) displaying the tone-mapped image Image C on the target display device 60. The manually tuned parameters $P_{tuned}$ and $Q_{tuned}$ adaptively compensate for the black level of the target display device 60, such that on-screen picture quality of the mastered image Image A is substantially similar to on-screen picture quality of the tone-mapped image Image C. For example, dark details of the mastered image Image A are preserved when reproduced on the target display device 60 as part of the tone-mapped image Image C.

In one embodiment, after the learning process, the manually tuned parameters $P_{tuned}$ and $Q_{tuned}$ are utilized in a development process during which a black level compensation algorithm is trained. After the development process, the resulting trained black level compensation algorithm is implemented in the black level compensation unit 270 to automatically modify, for an arbitrary sample (e.g., a mastered video provided to a HDR rendering display/device as input), parameters P and Q that characterize a mid tone and highlight basic tone mapping function to new parameters P' and Q' that characterize a modified tone mapping function with content adapted black level compensation, wherein the new parameters P' and Q' match (or are substantially similar) to the manually tuned parameters $P_{tuned}$ and $Q_{tuned}$.

In one embodiment, the development process involves changing a knee point Kp(1) of the first tone mapping curve Tone Map Curve 1 to a pre-defined value [Kp'(1), Kp'(2)], resulting in a new tone mapping curve Tone Map Curve 1A that deviates from the first tone mapping curve Tone Map Curve 1. To compensate for this deviation, an adjustment point P(1) for a high/higher curve (i.e., section) $B_N$ of the first tone mapping curve Tone Map Curve 1 is adjusted to a new adjustment point $P_A(1)$ (or $P_A$) for a high/higher curve (i.e., section) of the new tone mapping function Tone Map Curve 1A. This ensures that the high/higher curve of the new tone mapping function Tone Map Curve 1A keeps following a line representing the creative intent ("creative intent line") between two knee points. Further, as a high/higher curve (i.e., section) of a Bezier curve represents mid tone and highlight, this also keeps the new tone mapping function Tone Map Curve 1A close to the first tone mapping function Tone Map Curve 1 in the mid tone and highlight.

In one embodiment, the new adjustment point $P_A(1)$ is determined in accordance with equation (7) provided below:

$$P_A(1) = \alpha_{P1} P(1) + (1 - \alpha_{P1}) P_{CI} \qquad (7),$$

wherein $P_{CI}$ is an adjustment point for the creative intent line, and $P_{CI}$ is determined in accordance with equation (8) provided below:

$$P_{CI} = \frac{\max_L - KpLum'}{N * (tgt_L - KpLum')}, \qquad (8)$$

wherein $\max_L$ is a maximum luminance value of the mastered image Image A, $tgt_L$ is a luminance value of the target display device 60, respectively, N is the order of the high/higher curve representing mid tone and highlight, and KpLum' is determined in accordance with equation (9) provided below:

$$KpLum' = Kp'(2) * tgt_L \qquad (9),$$

wherein $\alpha_{P1}$ is a merging factor determined utilizing a ramp function controlled based on $\Delta L$, and $\Delta L$ is determined in accordance with equation (10) provided below:

$$\Delta_L = \frac{\max_L - tgt_L}{\max_L}. \qquad (10)$$

In one embodiment, the new parameters P' and Q' are represented in accordance with equations (11)-(12) provided below:

$$P' = P_A + \Delta P \qquad (11), \text{ and}$$

$$Q' = Q + \Delta Q \qquad (12),$$

wherein $\Delta P$ (or $\Delta P(i)$) and $\Delta Q$ (or $\Delta Q(i)$) are curve modifiers, Q is a parameter that characterizes the creative intent line, and Q is determined in accordance with equation (13) provided below:

$$Q(i) = i/N, i = 1 \ldots N-1 \qquad (13).$$

In one embodiment, the curve modifiers $\Delta P$ and $\Delta Q$ are determined based on metadata to minimize differences between the new P' and Q' values and the manually tuned $P_{tuned}$ and $Q_{tuned}$ values. Specifically, in one embodiment, the black level compensation unit 270 is configured to determine three factors subProbLowDiff, subProbHighDiff$_{Ratio}$, and subProbmaxL for controlling the curve modifiers $\Delta P$ and $\Delta Q$.

In one embodiment, black level related metadata (e.g., from the metadata parser 250) corresponding to a mastered video comprises percentages percentHigh and percentiles pLumHigh in a percentile range $[0, \max_L]$ of luminance values. In one embodiment, the black level compensation unit 270 is configured to generate interpolated percentages percentHighL and interpolated percentiles pLumHighL in a percentile range $[0, \text{high}_L]$ of luminance values by applying interpolation to the percentages percentHigh and the percentiles pLumHigh, respectively, wherein $\text{high}_L$ is a maximum percentile of luminance value. The interpolation keeps all the percentiles that are lower than the maximum percentile $\text{high}_L$, and adds new items at 100% percentage and at the maximum percentile $\text{high}_L$.

Let subProbHighDiff generally denote differences between interpolated percentiles pLumHighL and uniform histogram percentiles dockProb at the S levels. In one embodiment, the difference subProbHighDiff is determined in accordance with equation (14) provided below:

$$\text{subProbHighDiff} = \Sigma_{k=1}^{N} \Delta p \text{Probdock}(k) \qquad (14).$$

In one embodiment, the factor subProbHighDiff$_{Ratio}$ is determined utilizing a ramp function controlled based on the difference subProbHighDiff.

In one embodiment, black level related metadata (e.g., from the metadata parser 250) corresponding to a mastered video comprises percentages percentLow and percentiles pLumLow. In one embodiment, the black level compensation unit 270 is configured to generate interpolated percentages percentLowL and interpolated percentiles pLumLowL by applying interpolation to the percentages percentLow and the percentiles pLumLow, respectively.

Let subProbLowDiff generally denote differences between interpolated percentiles pLumLowL and uniform histogram percentiles dockProb at the S levels. In one embodiment, the difference subProbLowDiff is determined in accordance with equation (15) provided below:

$$\text{subProbLowDiff} = \Sigma_{k=1}^{N} \Delta p \text{ProbdockLumsLow}(k) \qquad (15).$$

In one embodiment, the black level compensation unit 270 is configured to determine, based on black level related metadata (e.g., from the metadata parser 250) corresponding to a mastered video, a factor subProbmaxL corresponding to highlight pixels of the mastered video. In one embodiment, the factor subProbmaxL is based on an average pLumHigh_mean of the three highest percentiles of pLumHigh. In one embodiment, the average pLumHigh_mean is determined in accordance with equation (16) provided below:

$$\text{pLumHigh\_mean} = \frac{pLumHigh(L-1) + pLumHigh(L)}{3} + \frac{pLumHigh(L-2) +}{3}, \qquad (16)$$

wherein L is a number of percentiles in the black level related metadata. In one embodiment, the factor subProbmaxL is determined utilizing a ramp function controlled based on the average pLumHigh_mean.

In one embodiment, the black level compensation unit 270 is configured to determine, based on the three factors subProbLowDiff, subProbHighDiff$_{Ratio}$, and subProbmaxL, a combined factor subProbAll for controlling the curve modifiers $\Delta P$ and $\Delta Q$. In one embodiment, the combined factor subProbAll is determined in accordance with equation (17) provided below:

$$\text{subProbAll} = \text{subProbLowDiff} + \text{subProbHighDiff}_{Ratio} + \text{subProbmax}L \qquad (17).$$

In one embodiment, the black level compensation unit 270 is configured to determine, based on the combined factor subProbAll, the curve modifiers $\Delta P$ and $\Delta Q$ for modifying a mid tone and highlight basic tone mapping function (i.e., basic tone mapping curve). In one embodiment, the curve modifiers $\Delta P$ and $\Delta Q$ are determined utilizing ramp functions controlled based on the combined factor subProbAll.

In one embodiment, the black level compensation unit 270 is configured to modify a mid tone and highlight basic tone mapping function with corresponding parameters P and Q based on the curve modifiers the curve modifiers $\Delta P$ and $\Delta Q$, resulting in a modified tone mapping function (i.e., modified tone mapping curve) with corresponding parameters P' and Q'.

Figures 8, 9:
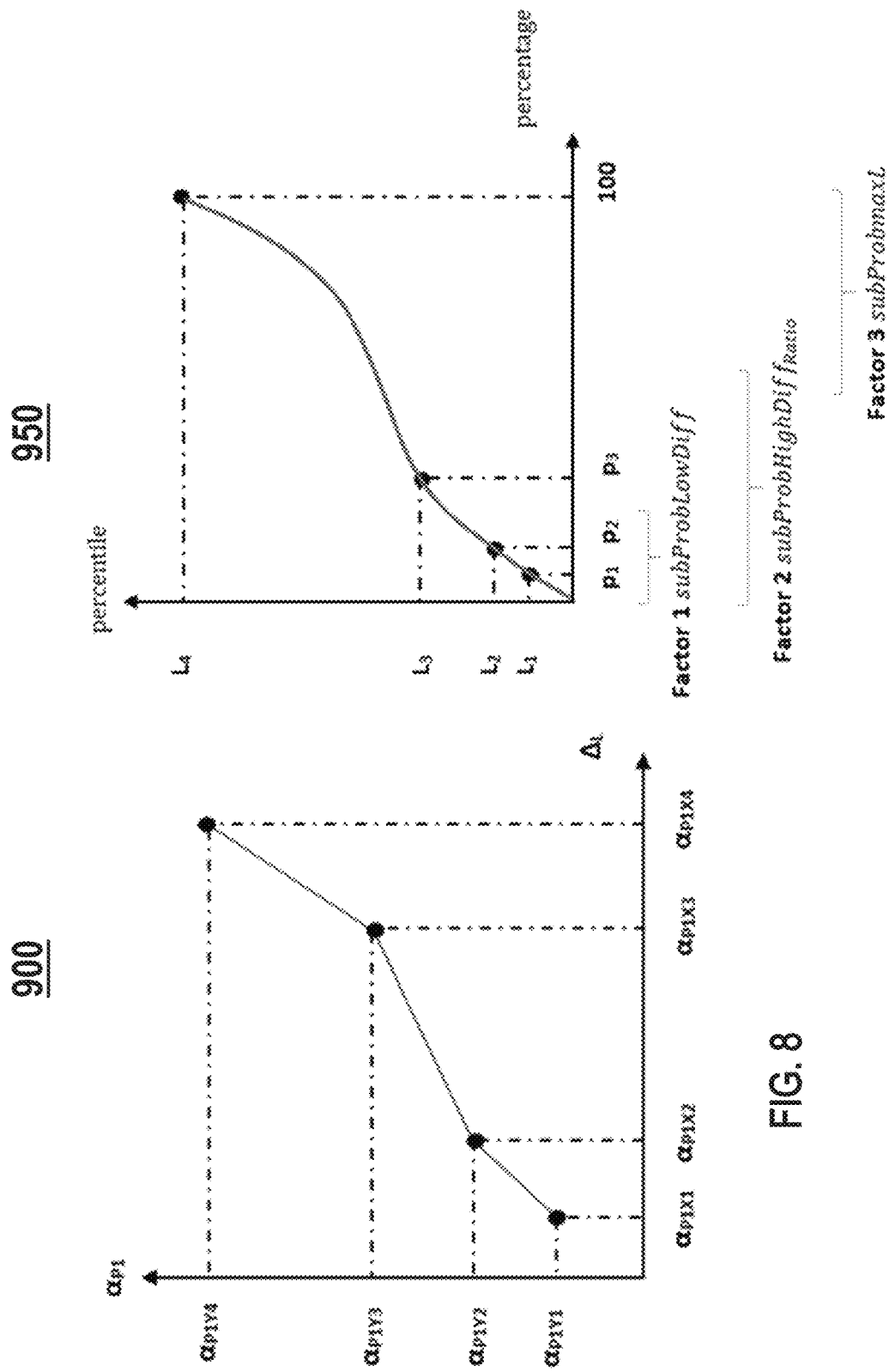
FIG. 8 is a graph illustrating a ramp function for a merging factor, in one or more embodiments.
FIG. 9 is a graph illustrating three factors for controlling curve modifiers, in one or more embodiments.

FIG. 8 is a graph 900 illustrating a ramp function for merging factor $\alpha_{P1}$, in one or more embodiments. A horizontal axis of the graph 900 represents ΔL. A vertical axis of the graph 900 represents $\alpha_{P1}$. $\alpha_{P1X1}$, $\alpha_{P1X2}$, $\alpha_{P1X3}$, $\alpha_{P1X4}$, $\alpha_{P1Y1}$, $\alpha_{P1Y2}$, $\alpha_{P1Y3}$, and $\alpha_{P1Y4}$ are pre-defined values. As shown in FIG. 8, $\alpha_{P1}$ is determined utilizing a ramp function controlled based on ΔL.

FIG. 9 is a graph 950 illustrating three factors for controlling curve modifiers ΔP and ΔQ, in one or more embodiments. A horizontal axis of the graph 950 represents percentages. A vertical axis of the graph 950 represents percentiles. The graph 950 comprises a curve, wherein one or more sections of the curve represents one or more of three factors three factors subProbLowDiff, subProbHighDiff$_{Ratio}$, and subProbmaxL.

FIG. 10 is a graph 1000 illustrating percentages percentHigh and percentiles pLumHigh, in one or more embodiments. A horizontal axis of the graph 1000 represents percentHigh. A vertical axis of the graph 1000 represents pLumHigh. The graph 1000 comprises a curve representing pLumHigh.

FIG. 11 is a graph 1050 illustrating interpolated percentages percentHighL and interpolated percentiles pLumHighL, in one or more embodiments. A horizontal axis of the graph 1050 represents percentHigh. A vertical axis of the graph 1050 represents pLumHigh. The graph 1000 comprises a curve representing pLumHighL. As shown in FIG. 11, in one embodiment, the percentile range [0, high$_L$] is divided into S levels.

FIG. 12 is a graph 1100 illustrating differences between interpolated percentiles pLumHighL and uniform histogram percentiles dockProb, in one or more embodiments. A horizontal axis of the graph 1100 represents percentages. A vertical axis of the graph 1100 represents percentiles. The graph 1100 comprises a first curve 1101 representing pLumHighL ("interpolated percentiles curve"), and a second curve 1102 representing uniform histogram percentiles dockProb ("uniform histogram percentiles curve"). As shown in FIG. 12, the percentile range [0, high$_L$] is divided into S levels. The black level compensation unit 270 is configured to determine, at each of the S levels, a corresponding difference ΔpProbdock(k) representing a difference in percentages between the interpolated percentiles curve and the uniform histogram percentiles curve dockProb. At the percentile k*high$_L$/s, a corresponding difference ΔpProbdock(k) represents a difference between a percentage pHL$_k$ of the interpolated percentiles curve and a percentage dP$_k$ of the uniform histogram percentiles curve. For example, if k=2, a difference ΔpProbdock(2) corresponding to the percentile $$2 * \frac{high_L}{S}$$

represents a difference between a percentage pHL$_2$ of the interpolated percentiles curve and a percentage dP$_2$ of the uniform histogram percentiles curve.

FIG. 13 is a graph 1150 illustrating a ramp function for factor subProbHighDiff$_{Ratio}$, in one or more embodiments. A horizontal axis of the graph 1150 represents subProbHighDiff. A vertical axis of the graph 1150 represents subProbHighDiff$_{Ratio}$. $\alpha_{PHDX1}$, $\alpha_{PHDX2}$, $\alpha_{PHDX3}$, $\alpha_{PHDX4}$, $\alpha_{PHDY1}$, $\alpha_{PHDY1}$, $\alpha_{PHDY3}$, and $\alpha_{PHDY4}$ are pre-defined values. As shown in FIG. 13, subProbHighDiff$_{Ratio}$ is determined utilizing a ramp function controlled based on the difference subProbHighDiff.

Figure 14:
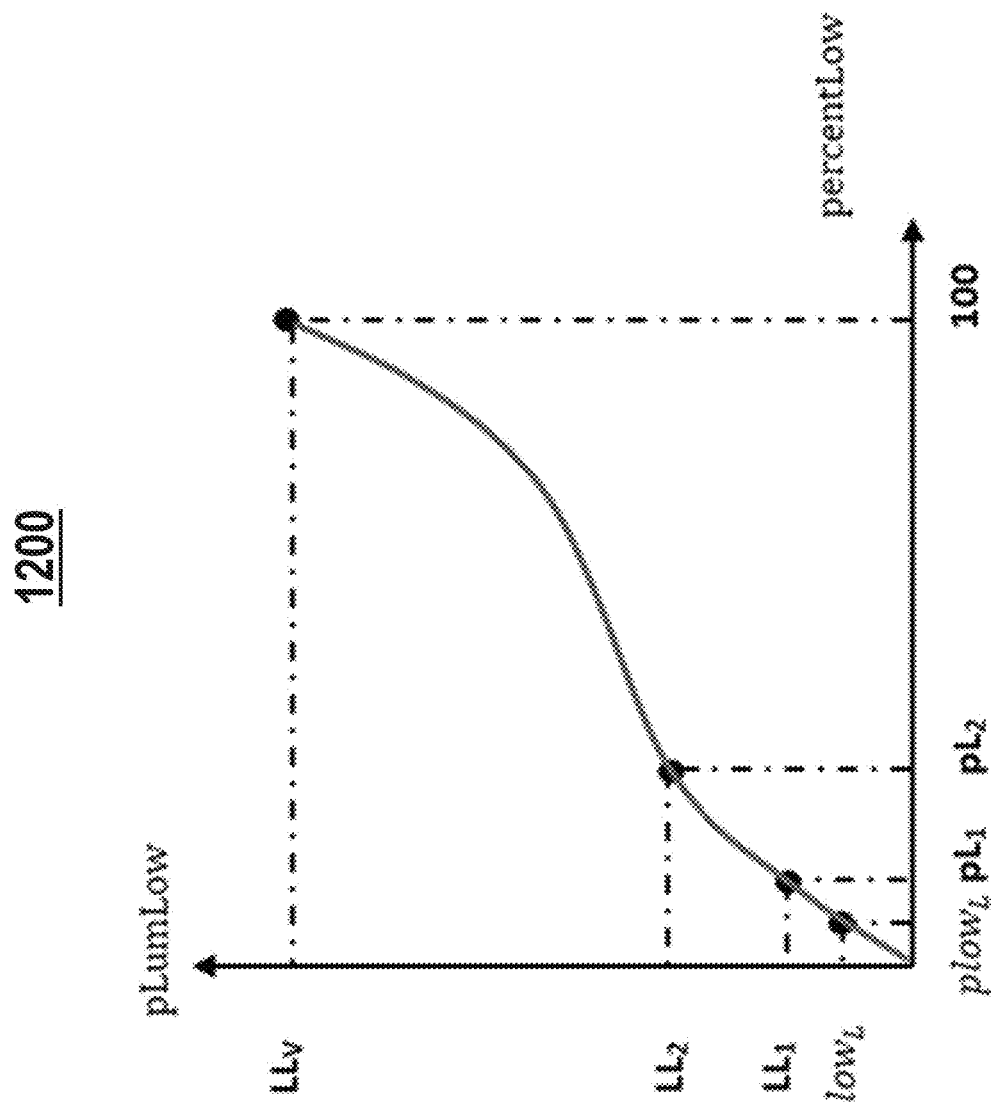
FIG. 14 is a graph illustrating percentages and percentiles, in one or more embodiments.

FIG. 14 is a graph 1200 illustrating percentages percentLow and percentiles pLumLow, in one or more embodiments. A horizontal axis of the graph 1200 represents percentLow. A vertical axis of the graph 1200 represents pLumLow. The graph 1200 comprises a curve representing pLumLow.

FIG. 15 is a graph 1250 illustrating a ramp function for factor subProbmaxL, in one or more embodiments. A horizontal axis of the graph 1250 represents pLumHigh_mean. A vertical axis of the graph 1250 represents subProbmaxL. $\alpha_{LHMX1}$, $\alpha_{LHMX2}$, $\alpha_{LHMX3}$, $\alpha_{LHMX4}$, $\alpha_{LHMY1}$, $\alpha_{LHMY2}$, $\alpha_{LHMY3}$, and $\alpha_{LHMY4}$ are pre-defined values. As shown in FIG. 15, subProbmaxL is determined utilizing a ramp function controlled based on the average pLumHigh_mean.

FIG. 16 is a graph 1300 illustrating a ramp function for curve modifier ΔP(i), in one or more embodiments. A horizontal axis of the graph 1300 represents subProbAll. A vertical axis of the graph 1300 represents ΔP(i). $\alpha_{PMLiX1}$, $\alpha_{PMLiX2}$, $\alpha_{PMLiX3}$, $\alpha_{PMLiX4}$, $\alpha_{PMLiY1}$, $\alpha_{PMLiY2}$, $\alpha_{PMLiY3}$, and $\alpha_{PMLiY4}$ are pre-defined values that minimized a difference between the new parameter P' and the manually tuned parameter P$_{tuned}$. As shown in FIG. 16, the curve modifier ΔP(i) is determined utilizing a ramp function controlled based on the combined factor subProbAll. The curve modifier ΔQ(i) is similarly determined utilizing another ramp function controlled based on the combined factor subProbAll.

Figure 17A:
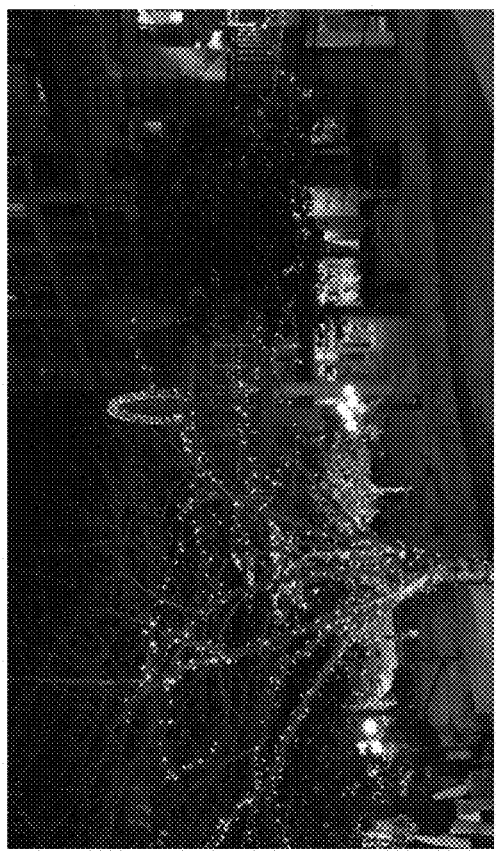
FIG. 17A is an example mastered image viewed on a reference display with zero black level, in one or more embodiments.

FIG. 17A is an example mastered image 1400 viewed on a reference display with zero black level, in one or more embodiments. In one embodiment, the mastered image 1400 is viewed on the reference display at a studio suitable for color grading. For example, the mastered image 1400 is viewed by a colorist on a rendering monitor 370.

Figure 17B:
FIG. 17B is an example tone-mapped image with black level compensation viewed on a target display device with non-zero black level, in one or more embodiments.

FIG. 17B is an example tone-mapped image 1450 with black level compensation viewed on a target display device 60 with non-zero black level, in one or more embodiments. In one embodiment, the tone-mapped image is viewed on the target display device 60 at a consumer end. For example, the tone-mapped image 1450 is viewed by a user on a consumer-grade HDR TV. The HDR tone mapping with black level compensation system 240 generates a black level compensation curve based on creative intent metadata corresponding to the mastered image 1400 (FIG. 17A), and applies black level compensation to the mastered image 1400 based on the black level compensation curve, resulting in the tone-mapped image 1450 with black level compensation for the non-zero black level of the target display device 60. The tone-mapped image 1450 preserves black details and shadow details of the mastered image 1400.

Figure 18B:
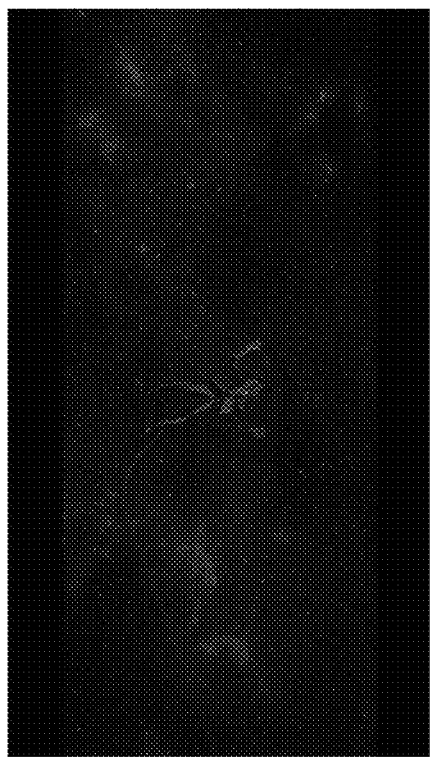
FIG. 18B is another example tone-mapped image without black level compensation viewed on a target display device with non-zero black level, in one or more embodiments.
Figure 18A:
FIG. 18A is another example mastered image viewed on a reference display with zero black level, in one or more embodiments.

FIG. 18A is another example mastered image 1500 viewed on a reference display with zero black level, in one or more embodiments. In one embodiment, the mastered image 1500 is viewed on the reference display at a studio suitable for color grading. For example, the mastered image 1500 is viewed by a colorist on a rendering monitor 370.

FIG. 18B is another example tone-mapped image 1550 without black level compensation viewed on a target display device 60 with non-zero black level, in one or more embodiments. In one embodiment, the tone-mapped image 1550 is viewed on the target display device 60 at a consumer end. For example, the tone-mapped image 1550 is viewed by a user on a consumer-grade HDR TV with a black level of 0.5 nits. Without black level compensation for the non-zero black level of the target display device 60, black details and shadow details of the mastered image 1400 appear washed out with less contrast when reproduced on the target display device 60 as part of the tone-mapped image 1550.

Figure 18C:
FIG. 18C is another example tone-mapped image with black level compensation viewed on a target display device with non-zero black level, in one or more embodiments.

FIG. 18C is another example tone-mapped image 1600 with black level compensation viewed on a target display device 60 with non-zero black level, in one or more embodiments. In one embodiment, the tone-mapped image 1600 is viewed on the target display device 60 at a consumer end. For example, the tone-mapped image 1600 is viewed by a user on a consumer-grade HDR TV with a black level of 0.5 nits. The HDR tone mapping with black level compensation system 240 generates a black level compensation curve based on creative intent metadata corresponding to the mastered image 1500 (FIG. 18A), and applies black level compensation to the mastered image 1500 based on the black level compensation curve, resulting in the tone-mapped image 1600 with black level compensation for the non-zero black level of the target display device 60. The tone-mapped image 1600 preserves black details and shadow details of the mastered image 1500.

One or more embodiments can be implemented on any consumer display device with a non-zero black level to make black details and shadow areas appear similar to those displayed on a reference display.

Figure 19:
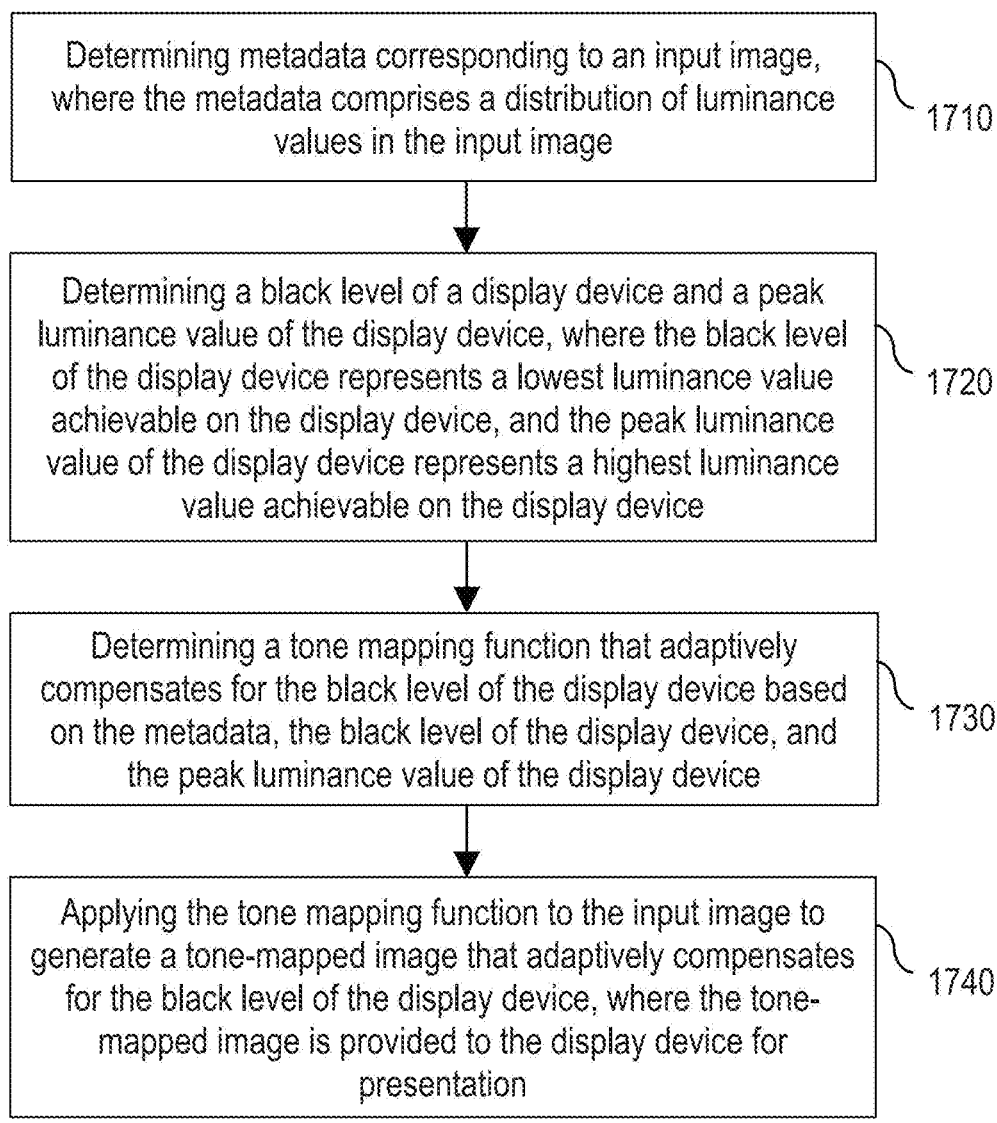
FIG. 19 is a flowchart of an example process for implementing content adapted black level compensation for a HDR display based on dynamic metadata, in one or more embodiments.

FIG. 19 is a flowchart of an example process 1700 for implementing content adapted black level compensation for a HDR display based on dynamic metadata, in one or more embodiments. Process block 1710 includes determining metadata corresponding to an input image, wherein the metadata comprises a distribution of luminance values in the input image. Process block 1720 includes determining a black level of a display device and a peak luminance value of the display device, wherein the black level of the display device represents a lowest luminance value achievable on the display device, and the peak luminance value of the display device represents a highest luminance value achievable on the display device. Process block 1730 includes determining a tone mapping function that adaptively compensates for the black level of the display device based on the metadata, the black level of the display device, and the peak luminance value of the display device. Process block 1740 includes applying the tone mapping function to the input image to generate a tone-mapped image that adaptively compensates for the black level of the display device, wherein the tone-mapped image is provided to the display device for presentation.

In one embodiment, process blocks 1710-1740 may be performed by one or more components of the HDR tone mapping system 200, such as the HDR tone mapping with black level compensation system 240 including the metadata parser unit 250, the black level compensation unit 270, and the tone mapping curve application unit 280.

Figure 20:
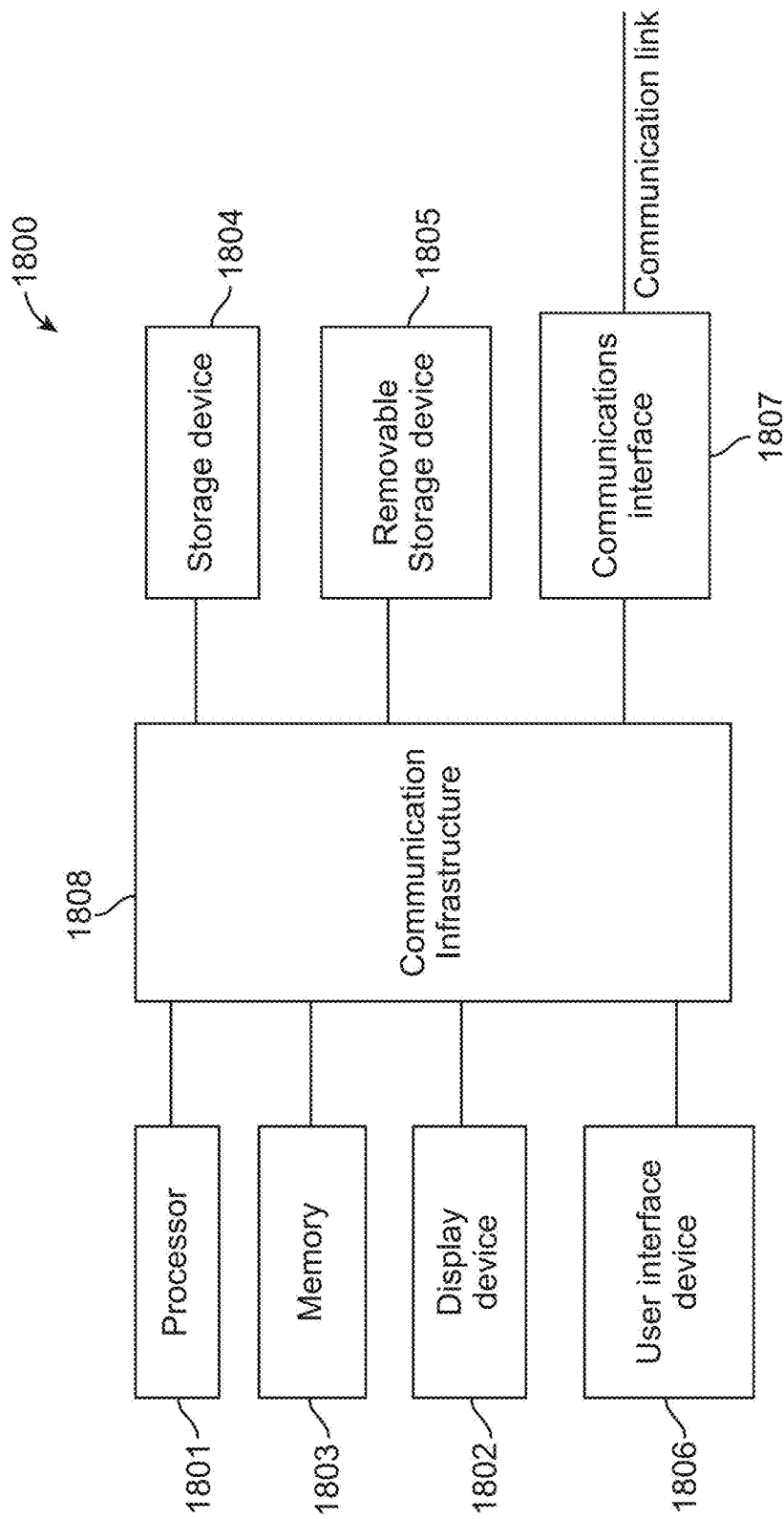
FIG. 20 is a high-level block diagram showing an information processing system comprising a computer system useful for implementing the disclosed embodiments.

FIG. 20 is a high-level block diagram showing an information processing system comprising a computer system 1800 useful for implementing the disclosed embodiments. The system 200 may be incorporated in the computer system 1800. The computer system 1800 includes one or more processors 1801, and can further include an electronic display device 1802 (for displaying video, graphics, text, and other data), a main memory 1803 (e.g., random access memory (RAM)), storage device 1804 (e.g., hard disk drive), removable storage device 1805 (e.g., removable storage drive, removable memory module, a magnetic tape drive, optical disk drive, computer readable medium having stored therein computer software and/or data), viewer interface device 1806 (e.g., keyboard, touch screen, keypad, pointing device), and a communication interface 1807 (e.g., modem, a network interface (such as an Ethernet card), a communications port, or a PCMCIA slot and card). The communication interface 1807 allows software and data to be transferred between the computer system and external devices. The system 1800 further includes a communications infrastructure 1808 (e.g., a communications bus, crossover bar, or network) to which the aforementioned devices/modules 1801 through 1807 are connected.

Information transferred via communications interface 1807 may be in the form of signals such as electronic, electromagnetic, optical, or other signals capable of being received by communications interface 1807, via a communication link that carries signals and may be implemented using wire or cable, fiber optics, a phone line, a cellular phone link, a radio frequency (RF) link, and/or other communication code values. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 1700 (FIG. 19) may be stored as program instructions on the memory 1803, storage device 1804, and/or the removable storage device 1805 for execution by the processor 1801.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   determining metadata corresponding to content, wherein the metadata comprises a black level of a reference display on which the content is presented during color grading of the content, the black level of the reference display represents a lowest luminance value achievable on the reference display, and the reference display is different from a device the content is captured with;
   determining display characteristics of a target display, wherein the display characteristics comprise a black level of the target display;
   determining a tone mapping function based on the metadata and the display characteristics, wherein the tone mapping function adaptively compensates for the black level of the target display when the black level of the target display is different from the black level of the reference display; and
   applying the tone mapping function to the content to generate tone-mapped content, wherein the tone-mapped content is provided to the target display for presentation.

2. The method of claim 1, wherein the metadata further comprises a distribution of luminance values in the content.

3. The method of claim 2, wherein the distribution of luminance values comprises a cumulative distribution function (CDF) of pixels in the content.

4. The method of claim 1, wherein determining a tone mapping function based on the metadata and the display characteristics comprises:
   determining whether the black level of the target display is different from the black level of the reference display.

5. The method of claim 4, wherein determining a tone mapping function based on the metadata and the display characteristics comprises:
   when the black level of the target display is not different from the black level of the reference display, generating the tone mapping function based on a first function without compensation for the black level of the target display.

6. The method of claim 5, wherein determining a tone mapping function based on the metadata and the display characteristics comprises:
   when the black level of the target display is substantially different from the black level of the reference display:
      modifying, based on the metadata and the display characteristics, the first function to a second function with compensation for the black level of the target display; and
      generating the tone mapping function based on the second function.

7. The method of claim 6, wherein the second function is a piecewise function comprising a first piece with compensation for the black level of the target display and a second piece without compensation for the black level of the target display.

8. A system comprising:
   at least one processor; and
   a non-transitory processor-readable memory device storing instructions that when executed by the at least one processor causes the at least one processor to perform operations including:
      determining metadata corresponding to content, wherein the metadata comprises a black level of a reference display on which the content is presented during color grading of the content, the black level of the reference display represents a lowest luminance value achievable on the reference display, and the reference display is different from a device the content is captured with;
      determining display characteristics of a target display, wherein the display characteristics comprise a black level of the target display;
      determining a tone mapping function based on the metadata and the display characteristics, wherein the tone mapping function adaptively compensates for the black level of the target display when the black level of the target display is different from the black level of the reference display; and
      applying the tone mapping function to the content to generate tone-mapped content, wherein the tone-mapped content is provided to the target display for presentation.

9. The system of claim 8, wherein the metadata further comprises a distribution of luminance values in the content.

10. The system of claim 9, wherein the distribution of luminance values comprises a cumulative distribution function (CDF) of pixels in the content.

11. The system of claim 8, wherein determining a tone mapping function based on the metadata and the display characteristics comprises:
    determining whether the black level of the target display is different from the black level of the reference display.

12. The system of claim 11, wherein determining a tone mapping function based on the metadata and the display characteristics comprises:
    when the black level of the target display is not different from the black level of the reference display, generating the tone mapping function based on a first function without compensation for the black level of the target display.

13. The system of claim 12, wherein determining a tone mapping function based on the metadata and the display characteristics comprises:
    when the black level of the target display is different from the black level of the reference display:
       modifying, based on the metadata and the display characteristics, the first function to a second function with compensation for the black level of the target display; and
       generating the tone mapping function based on the second function.

14. The system of claim 13, wherein the second function is a piecewise function comprising a first piece with compensation for the black level of the target display and a second piece without compensation for the black level of the target display.

15. A non-transitory processor-readable medium that includes a program that when executed by a processor performs a method comprising:
    determining metadata corresponding to content, wherein the metadata comprises a black level of a reference display on which the content is presented during color grading of the content, the black level of the reference display represents a lowest luminance value achievable on the reference display, and the reference display is different from a device the content is captured with;
    determining display characteristics of a target display, wherein the display characteristics comprise a black level of the target display;
    determining a tone mapping function based on the metadata and the display characteristics, wherein the tone mapping function adaptively compensates for the black level of the target display when the black level of the target display is different from the black level of the reference display; and applying the tone mapping function to the content to generate tone-mapped content, wherein the tone-mapped content is provided to the target display for presentation.

16. The non-transitory processor-readable medium of claim 15, wherein the metadata further comprises a distribution of luminance values in the content.

17. The non-transitory processor-readable medium of claim 16, wherein the distribution of luminance values comprises a cumulative distribution function (CDF) of pixels in the content.

18. The non-transitory processor-readable medium of claim 15, wherein determining a tone mapping function based on the metadata and the display characteristics comprises:

determining whether the black level of the target display is different from the black level of the reference display.

19. The non-transitory processor-readable medium of claim 18, wherein determining a tone mapping function based on the metadata and the display characteristics comprises:

when the black level of the target display is not different from the black level of the reference display, generating the tone mapping function based on a first function without compensation for the black level of the target display.

20. The non-transitory processor-readable medium of claim 19, wherein determining a tone mapping function based on the metadata and the display characteristics comprises:

when the black level of the target display is different from the black level of the reference display:

modifying, based on the metadata and the display characteristics, the first function to a second function with compensation for the black level of the target display; and generating the tone mapping function based on the second function, wherein the second function is a piecewise function comprising a first piece with compensation for the black level of the target display and a second piece without compensation for the black level of the target display.

* * * * *